United States Patent
Johnson, Jr. et al.

(10) Patent No.: US 10,871,756 B2
(45) Date of Patent: Dec. 22, 2020

(54) TEMPERATURE CONTROL SYSTEM AND METHODS FOR OPERATING SAME

(71) Applicant: Johnson Solid State, LLC, Washington, MI (US)

(72) Inventors: David Johnson, Jr., Washington, MI (US); Valerie Jean Johnson, Washington, MI (US); John Edward Dumar, Mt. Clemens, MI (US)

(73) Assignee: JOHNSON SOLID STATE, LLC, Washington, MI (US)

( * ) Notice: Subject to any disclaimer, the term of this patent is extended or adjusted under 35 U.S.C. 154(b) by 928 days.

(21) Appl. No.: 15/231,943

(22) Filed: Aug. 9, 2016

(65) Prior Publication Data

US 2016/0348936 A1    Dec. 1, 2016

Related U.S. Application Data

(63) Continuation-in-part of application No. 14/830,807, filed on Aug. 20, 2015, now Pat. No. 9,447,985.
(Continued)

(51) Int. Cl.
*G05B 21/00* (2006.01)
*G01M 1/38* (2006.01)
(Continued)

(52) U.S. Cl.
CPC .......... *G05B 19/0428* (2013.01); *F24F 11/30* (2018.01); *F24F 11/62* (2018.01);
(Continued)

(58) Field of Classification Search
CPC ................. F24F 11/0012; F24F 11/006; F24F 2011/0002; F24F 11/0001; F24F 11/0086;
(Continued)

(56) References Cited

U.S. PATENT DOCUMENTS 4,293,027 A * 10/1981 Tepe .................. G05D 23/1931
165/250
7,992,630 B2    8/2011 Springer
(Continued)

OTHER PUBLICATIONS

International Search Report and Written Opinion—PCT/US15/46185.
(Continued)

*Primary Examiner* — Zhipeng Wang
(74) *Attorney, Agent, or Firm* — Mitchell Law PLLC; Matthew W. Mitchell

(57) ABSTRACT

A method for operating a temperature control system is disclosed. The method includes monitoring an interior and exterior temperature of a structure, defining a first time range and a second time range, associating one or more operating parameters of the temperature control system with the first time range, associating one or more operating parameters of the temperature control system with the second time range, monitoring operational time and operational load of the cooling system for the first time range, predicting a space temperature and an outdoor air temperature for a subsequent time period, and controlling a ventilation subsystem during the second time range based upon the monitored operational time and operational load of the cooling subsystem for the first time range, the predicted space temperature, the predicted outdoor air temperature, and the one or more operating parameters of the cooling subsystem associated with the second time range.

61 Claims, 11 Drawing Sheets

Related U.S. Application Data

(60) Provisional application No. 62/041,701, filed on Aug. 26, 2014.

(51) Int. Cl.
| | |
|---|---|
| *G05B 13/00* | (2006.01) |
| *G05B 15/00* | (2006.01) |
| *G05D 23/00* | (2006.01) |
| *G05B 19/042* | (2006.01) |
| *F24F 11/30* | (2018.01) |
| *F24F 11/62* | (2018.01) |
| *G05B 15/02* | (2006.01) |
| *F24F 11/00* | (2018.01) |
| *F24F 110/10* | (2018.01) |
| *F24F 110/12* | (2018.01) |
| *F24F 110/22* | (2018.01) |
| *F24F 140/50* | (2018.01) |
| *F24F 140/60* | (2018.01) |
| *F24F 11/46* | (2018.01) |

(52) U.S. Cl.
CPC .............. *G05B 15/02* (2013.01); *F24F 11/46* (2018.01); *F24F 2011/0002* (2013.01); *F24F 2110/10* (2018.01); *F24F 2110/12* (2018.01); *F24F 2110/22* (2018.01); *F24F 2140/50* (2018.01); *F24F 2140/60* (2018.01); *G05B 2219/2614* (2013.01); *G05B 2219/2642* (2013.01)

(58) Field of Classification Search
CPC .. F24F 11/30; F24F 11/46; F24F 11/62; F24F 2011/0013; F24F 2011/0016; F24F 2011/0046; F24F 2011/0047; F24F 2011/0057; F24F 2011/0068; F24F 2011/0075; F24F 2011/0091; F24F 2110/10; F24F 2110/12; F24F 2110/22; F24F 2140/50; F24F 2140/60; G05B 15/02; G05B 19/0428; G05B 2219/2614; G05B 11/01; G05B 13/021; G05B 2219/2638; G05B 2219/2642; G05B 2219/33248; Y02B 30/542; Y02B 70/3275

See application file for complete search history.

(56) References Cited

U.S. PATENT DOCUMENTS

| | | | |
|---|---|---|---|
| 8,180,493 B1* | 5/2012 | Laskow | ............... F24F 11/0086 165/201 |
| 2004/0253918 A1 | 12/2004 | Ezell et al. | |
| 2005/0156052 A1 | 7/2005 | Bartlett | |
| 2006/0118646 A1* | 6/2006 | Masen | .................... F23N 5/003 236/49.1 |
| 2006/0207272 A1 | 9/2006 | Hirayama et al. | |
| 2007/0227721 A1* | 10/2007 | Springer | ............ G05D 23/1931 165/291 |
| 2012/0006525 A1* | 1/2012 | Lafleur | .............. G05D 23/1902 165/238 |
| 2012/0089269 A1* | 4/2012 | Weaver | .................. G06Q 50/06 700/295 |
| 2012/0145802 A1* | 6/2012 | Peterson | .............. F24F 11/0001 236/49.3 |
| 2013/0255297 A1 | 10/2013 | Matsuoka | |
| 2016/0061473 A1* | 3/2016 | Johnson, Jr. | ............. F24F 11/30 700/276 |

OTHER PUBLICATIONS

International Search Report—PCT/US2016/052556.
International Preliminary Report on Patentability—PCT/US2016/052556.
International Written Opinion—PCT/US2016/052556.

* cited by examiner

TEMPERATURE CONTROL SYSTEM AND METHODS FOR OPERATING SAME

CROSS-REFERENCE TO RELATED APPLICATION(S)

This application is a continuation-in-part of U.S. patent application Ser. No. 14/830,807, filed Aug. 20, 2015, which claims the benefit of U.S. Provisional Application Ser. No. 62/041,701, filed Aug. 26, 2014, all of which are hereby incorporated herein by reference for all purposes.

TECHNICAL FIELD

This disclosure relates to temperature control of buildings and other structures, and more particularly to predictive systems and methods for heating, cooling and/or ventilating buildings and other structures.

BACKGROUND

The statements in this section merely provide background information related to the present disclosure and may not constitute prior art.

Temperature control systems such as heating, ventilation, and air conditioning (HVAC) systems of structures, are operable to condition the interior air of the structure, i.e., to selectively heat and cool the interior air of the structure. The HVAC system includes mechanical systems for heating and cooling air that is delivered into the interior of the structure via ductwork, to selectively heat or cool the interior air.

Many HVAC systems have electronically controlled exterior air dampers, which are capable (when used in conjunction with the blower of the HVAC system) of circulating "fresh" exterior air into the structure. In addition to HVAC systems having mechanical means (cooling systems, often utilizing compressor(s), condenser fans, blower motors, etc.) to condition the space of the structure, many HVAC systems have the means to utilize cool exterior air to condition the space, via an exterior air damper (also referred to as an "economizer").

Many structures have electronically controlled exhaust systems, which are capable of exhausting air from the structure. Often, a structure's exhaust system(s) draws air from near the roof of the structure, and exhausts that air to the outside of the structure.

The operation of the mechanical systems, e.g., cooling, heating, and/or ventilation systems, consumes energy, adds wear and tear to the equipment, and increases the failure rate of that equipment, which may be financially costly. As such, it is desirable to condition the interior air of the structure to desired temperatures by utilizing predictive data.

SUMMARY

A method for operating a temperature control system having a cooling system and ventilation system to vent outside air within a structure is disclosed. The method includes monitoring an interior temperature of the structure, monitoring an exterior temperature of ambient air outside of the structure, defining a first time range and a second time range, associating one or more operating parameters of the temperature control system with the first time range, associating one or more operating parameters of the temperature control system with the second time range, monitoring operational time and operational load of the cooling system for the first time range, predicting a space temperature and an outdoor air temperature for a subsequent time period, and controlling the ventilation subsystem during the second time range based upon the monitored operational time and operational load of the cooling subsystem for the first time range, the monitored interior and exterior temperatures, the predicted space temperature, the predicted outdoor air temperature, and the one or more operating parameters of the cooling subsystem associated with the second time range.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
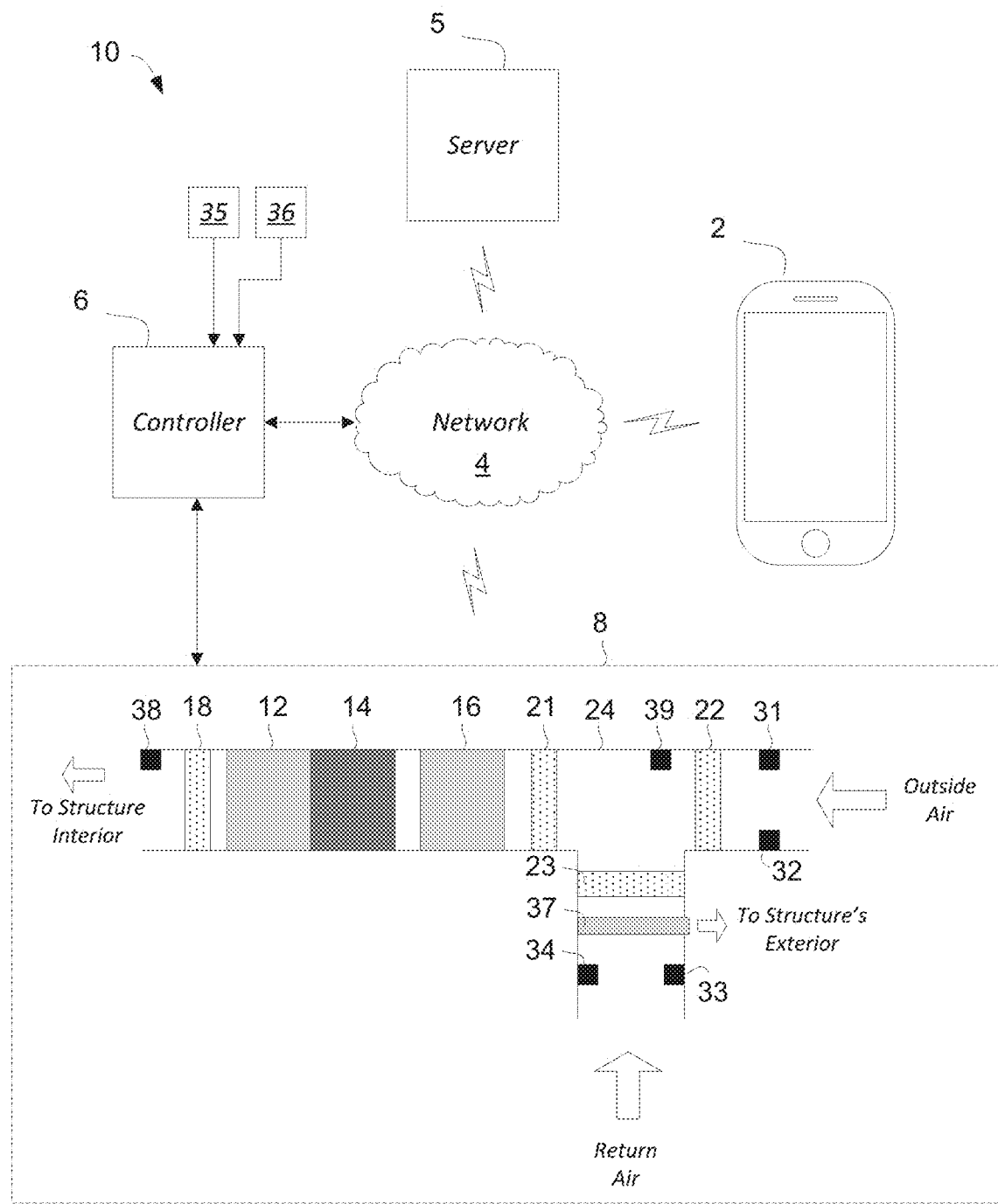
FIG. 1 schematically shows an exemplary HVAC system, in accordance with the present disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based upon" is not exclusive and allows for being based upon additional factors not described, unless the context clearly dictates otherwise. The word "exemplary" is used herein to mean "serving as an example, instance, or illustration." Any embodiment described herein as "exemplary" is not necessarily to be construed as preferred or advantageous over other embodiments. As used herein the terms building and structure may be used interchangeably. Upon a careful reading of the teachings herein, one skilled in the art may readily apply the teachings to any number of building and structure types falling within the spirit of this disclosure.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring now to the drawings, wherein the depictions are for the purpose of illustrating certain exemplary embodiments only and not for the purpose of limiting the same, FIG. 1 schematically shows an exemplary temperature control system 10 that may help implement the methodologies of the present disclosure. The system 10 may include various HVAC equipment components 8 configured to condition the interior air of the structure, i.e., to selectively heat and cool the interior air of the structure. The system 10 includes a controller 6 for controlling the HVAC equipment components 8. In various embodiments, the system 10 may include a server 5, a network 4 and/or a mobile device 2. The methods and devices of the present disclosure may be practiced with the HVAC system 10 and/or as part of HVAC system 10.

The server 5 may be directly communicatively connected to the controller 6 and the mobile device 2 or communicatively connected via the network 4. The server 5 may be: various embodiments of a computer including high-speed microcomputers, minicomputers, mainframes, and/or data storage devices. The server 5 preferably executes database functions including storing and maintaining a database and processes requests from the controller 6 and/or mobile device 2 to extract data from, or update, a database as described herein below. The server 5 may additionally provide processing functions for the mobile device 2 and the controller 6 as will become apparent to those skilled in the art upon a careful reading of the teachings herein.

As shown in FIG. 1, the HVAC controller 6 may be directly communicatively connected to one or more of the HVAC equipment components 8 including one or more sensors 31, 32, 33, and/or 34. In one embodiment, the controller 6 is wirelessly connected to the one or more HVAC equipment components 8 via the network 4. In embodiments utilizing a mobile device 2, the mobile device 2 may be physically or wirelessly connected to the network 4 and/or the controller 6 during selected periods of operation without departing from the teachings herein. Components of the system 10 are shown in FIG. 1 as single elements. Such illustration is for ease of description and it should be recognized that the system 10 may include multiple additional components in various embodiments without departing from the teachings herein. For example, in various embodiments the controller 6 may be incorporated into the server 5.

The exemplary HVAC system 10 shown in FIG. 1 includes an HVAC controller 6, which may be or may include a thermostat or a hydronic heat transfer system control in some embodiments. The HVAC controller 6 may be configured to communicatively interact with and control various components of the HVAC components 8. As shown in FIG. 1, the HVAC controller 6 may be directly connected to the HVAC components 8 or connected via a network 4 which may be a locally based network or a wider network such as the Internet. In various embodiments, the mobile device 2 is communicatively connected to the controller 6 so that a user may control the HVAC components 8 using the mobile device 2 via the controller 6.

The HVAC components 8 may include a heating system 12, a cooling system 14, a ventilation system 16 including a fan, i.e., a blower, a humidification system 18 and/or any other HVAC components or systems, as desired such as an outside air damper 22 or intake damper 23. In various embodiments, HVAC components include auxiliary heating and cooling equipment. Exhaust fans 37 and supply air fans 16, removing air from the structure, and moving air into the structure, respectively, may also be used in various embodiments. The HVAC components 8 primarily function as a forced air system although auxiliary HVAC components may be used in conjunction to supplement conditioning of the environment within the building. For example, auxiliary heat may be provided by electrical resistive heaters, hot water radiant heat, boilers, and/or electric base board heaters in various embodiments.

As illustrated in exemplary FIG. 1, the heating system 12 and the cooling system 14 are combined in a forced air system; however, it is contemplated herein that the heating and cooling systems 12 and 14 may be separated. For example, in residential and/or light commercial applications, in various embodiments, a heat pump system may be utilized separate from an air conditioning cooling system 14.

In various embodiments the HVAC components 8 include any number of intake and outtake dampers. In the illustrated embodiment a filter 21, a first damper 22, and a second damper 23 are utilized consistent with the teachings herein. The damper 22 may be in communication with outside air and the fan 16 is in communication with one or more of the dampers 22 and 23 within a ducting 24, for example. The dampers 22 and 23 may be selectively actuatable as a group or individually in various embodiments.

The HVAC components 8 may include cooling equipment, which may include more than one unit and/or more than one stage of cooling. The HVAC components 8 are selectively in gaseous communication with exterior ambient air and including operability to intake and/or vent exterior ambient air. In various embodiments the ventilation equipment may provide different levels of air movement as described herein below. The HVAC components 8 may include other units such as a humidifier unit, a dehumidifier unit, a UV filter unit and/or any other suitable HVAC unit and/or equipment as desired.

The HVAC components 8 may include one or more sensors, such as an exterior ambient air temperature sensor 31, an exterior humidity sensor 32, a return temperature sensor 33, and/or a smoke detector 34. The sensors 31, 32, 33, and 34 may be directly or indirectly communicatively connected to the controller 6. The exterior ambient temperature sensor 31 is configured to measure a temperature of the outside air and, for example, may be mounted to an exterior of the building, or factory installed as part of the HVAC components 8. The exterior humidity sensor 32 may also be mounted external to ducting of the HVAC components 8 or factory installed as part of the HVAC components 8. An interior temperature sensor 35 measures a temperature of the interior air of the building. The sensor 35 may be internal to the controller 6 or external. Optionally, an interior humidity sensor 36 measures the humidity of the interior air of the structure. The sensor 36 may be internal to the controller 6 or external. In one embodiment, the controller 6 may obtain outside, i.e., exterior air temperature and/or humidity conditions through an online weather service or may be in communication with a building automation system having equivalent measuring functionality. In one embodiment, predicted weather conditions may be utilized by the controller 6. In various embodiments, the interior and exterior humidity sensors 36 and 32 are optional. In various embodiments, sensors 33 and 34 are optional.

The network 4 may be any suitable series of points or nodes interconnected by communication paths. The network 4 may be interconnected with other networks and contain sub network(s) such as, for example, a publicly accessible distributed network like the Internet or other telecommunications networks (e.g., intranets, virtual nets, overlay networks and the like). The network 4 may facilitate the exchange of data between and among the HVAC components 8, the HVAC controller 6, and the sensors 31, 32, 33, 34, 35 and 36; although in various embodiments the HVAC controller 6 may be directly connected to the HVAC components 8 and/or the sensors 31, 32, 33, 34, 35 and 36.

In various embodiments, the mobile device 2 may include one or more applications that the user may operate. Operation may include downloading, installing, turning on, unlocking, activating, or otherwise using the application in conjunction with the controller 6. The application may comprise at least one of an algorithm, software, computer code, executable instruction sets and/or the like, for example, mobile application software. In the alternative, the application may be utilized remotely through a website accessible through the world wide web.

Figure 2:
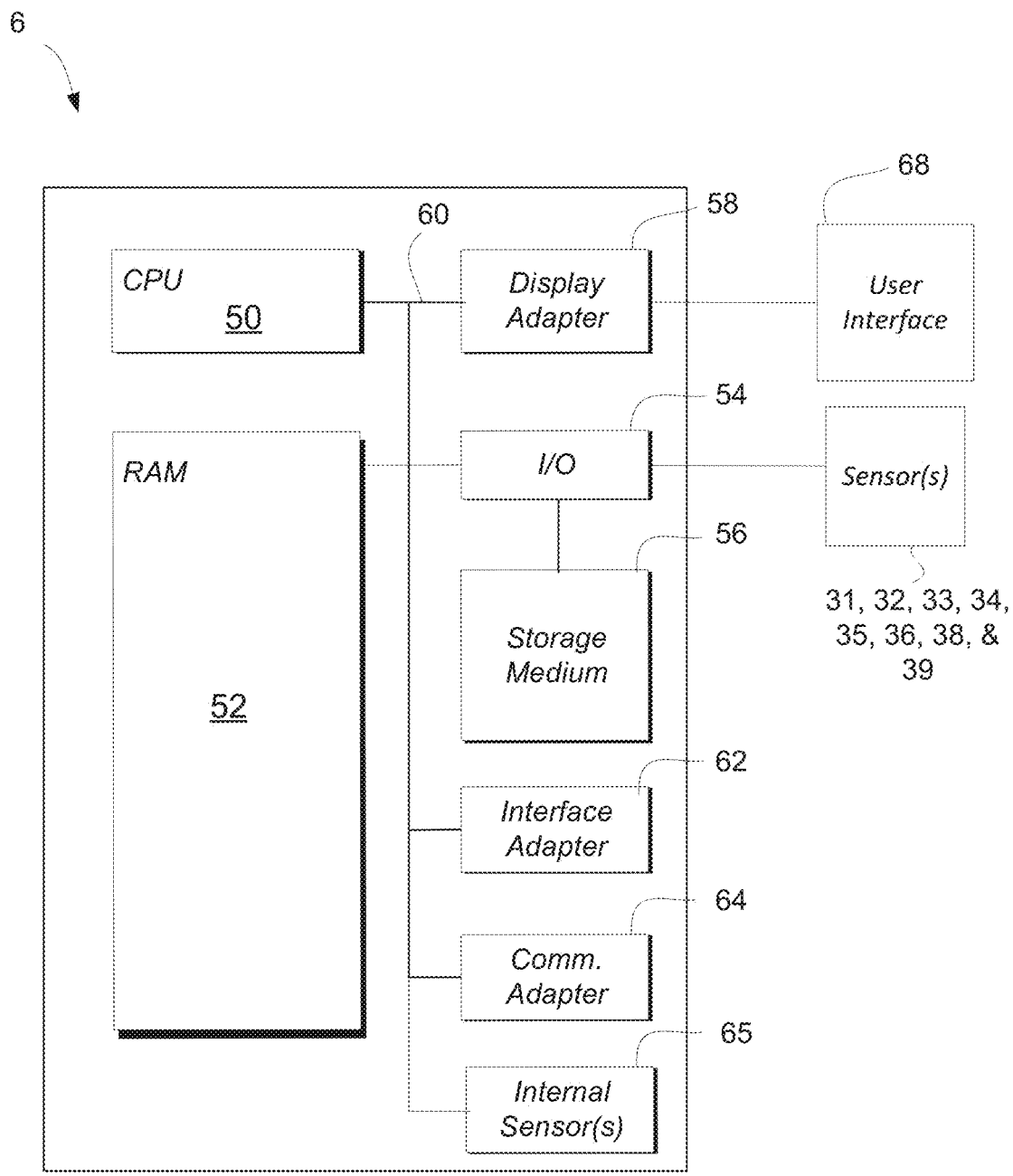
FIG. 2 schematically shows an exemplary HVAC controller, in accordance with the present disclosure.

FIG. 2 shows the exemplary HVAC controller 6. The controller 6 includes a central processing unit (CPU) 50, random access memory (RAM) 52, input/output circuitry 54 for connecting peripheral devices such as a storage medium 56 to a system bus 60, a display adapter 58 for connecting the system bus 60 to a display device, a user interface adapter 62 for connecting user input devices such as various dials buttons and/or keypads, to the system bus 60, and a communication adapter 64 for connecting the controller 6 to the network 4. The memory 52 and storage medium 56 may be used to store any appropriate information such as HVAC control routines or code, historical performance data, HVAC system and/or HVAC controller parameters, one or more programmable schedules for changing HVAC system parameters over time, etc.

The central processing unit 50 is preferably one or more general-purpose microprocessor or central processing unit(s) and has a set of control algorithms, comprising resident program instructions and calibrations stored in the memory 52 and executed to provide the desired functions. In one embodiment, an application program interface (API) is preferably executed by the operating system for computer applications to make requests of the operating system or other computer applications. The description of the central processing unit 50 is meant to be illustrative, and not restrictive to the disclosure, and those skilled in the art will appreciate that the disclosure may also be implemented on platforms and operating systems other than those mentioned.

The HVAC controller 6 may include any number of suitable components related to effecting control of the HVAC system 10. For example, HVAC controller 6 may include a user interface 68 which may be graphical. The user interface 68 may include one or more displays, switches, and/or buttons that a user may actuate or otherwise control. In one embodiment, a touchscreen display may be provided to display the user interface 68 and provide interaction therewith.

In one embodiment, one or more of a cooling device, heating equipment and/or ventilation equipment may be distinct systems controlled, either directly or indirectly, by the HVAC controller 6. In some embodiments, it is contemplated that the HVAC controller 6 may separately control each component 8. HVAC system parameters may include set points for heating, cooling, humidity, etc., modes for ventilation equipment, fan settings, and the like and as further described below.

The HVAC controller 6 may include one or more internal sensors 65, such as a temperature sensor and/or a humidity sensor. The internal sensors 65 may be in addition to the sensors 35 and 36 and may be used for supplemental or redundancy purposes, as exemplary. The HVAC controller 6 may include one or more outputs configured to issue operation commands to the HVAC components 8. It is contemplated herein that the HVAC controller 6 may be configured to execute any method of the present disclosure. The HVAC controller 6 may be communicatively connected to one or more sensors connected external to a building structure and external to a housing of the controller 6. The connection may be via wire or via a wireless embodiment of the network 4.

In various embodiments, the HVAC controller 6 may maintain in its memory an operating schedule that may be used to control the HVAC system based upon time and/or day. The schedule may, for example, be a daily programmable schedule or any other schedule. In some cases, the schedule may have a number of days and one or more time periods for each of at least some of the days. In some instances, the nominal schedule may include an "occupied", an "unoccupied", and a "stand-by" time period for each of the days of a week. The schedule may have at least one set point associated with each of the one or more time periods. The schedule may be maintained in the memory 52, and may be modified by an end user in various embodiments.

Figure 3:
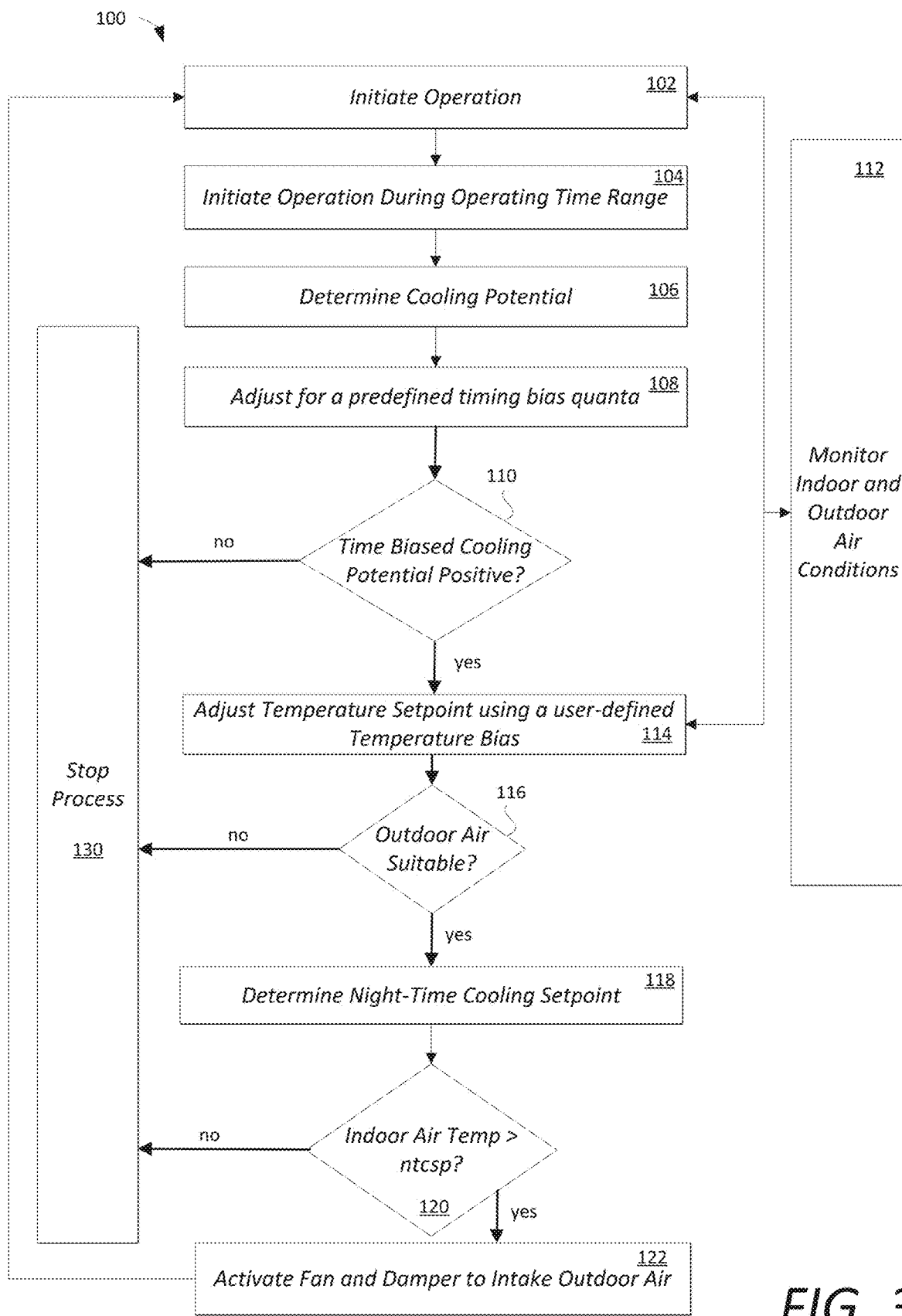
FIG. 3 is a control scheme for operating the exemplary HVAC system, in accordance with the present disclosure.

FIG. 3 shows a control scheme 100 for operating the controller 6 and the HVAC components 8. Although the control scheme 100 is shown as discrete elements, such an illustration is for ease of description and it should be recognized that the functions performed by the control scheme 100 may be combined in one or more devices, e.g., implemented in software, hardware, and/or application-specific integrated circuitry (ASIC) and executed, in some cases, concurrently or in parallel. For example, monitoring of the various sensors may be executed concurrent with any number of execution steps.

Figure 7:
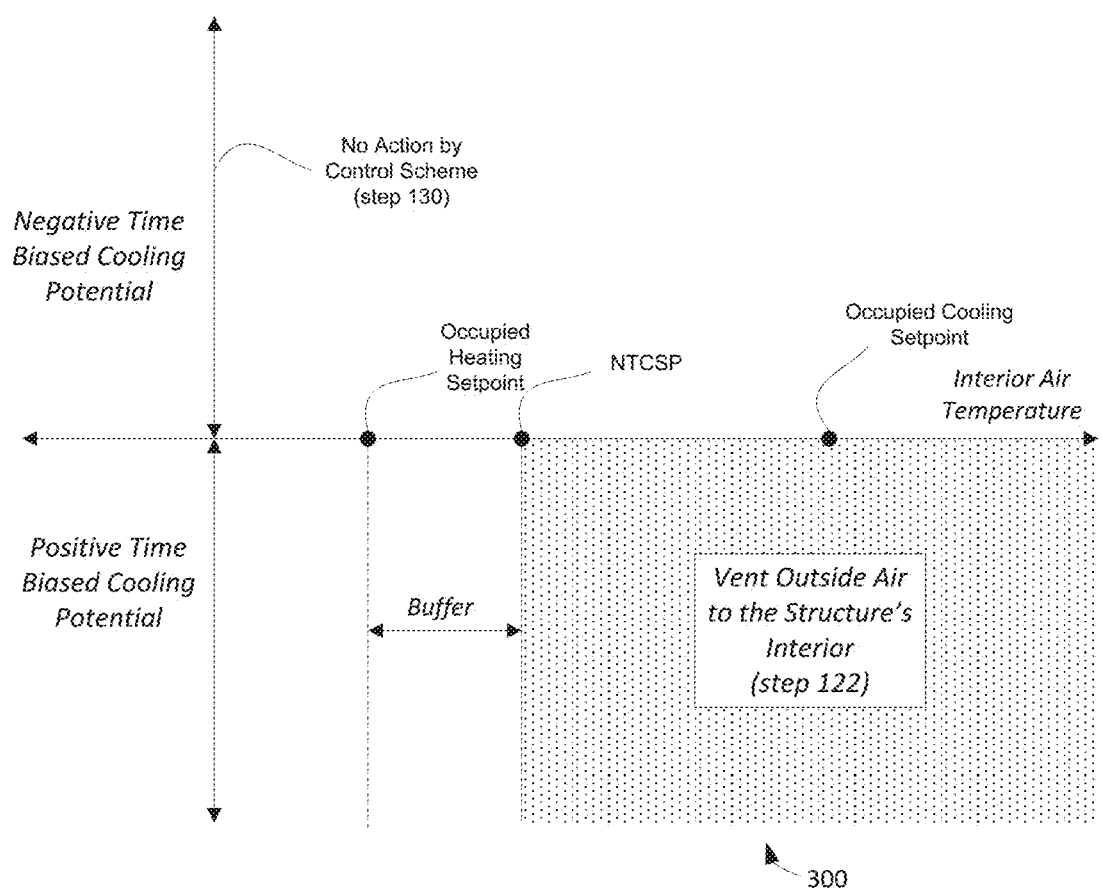
FIG. 7 graphically shows operation of the HVAC system for venting outside air into a structure with respect to indoor temperature, in accordance with the present disclosure.

The control scheme 100 is directed at operating efficiencies that can be gained from utilizing exterior ambient conditions to ventilate outside air into the structure and/or condition the interior environment. For example, during warm summer months, the coldest part of the day is typically in the early morning, such as between 4:00 am and 6:00 am. As set forth further below, during this early morning time, the controller 6 instructs one or more of the HVAC components 8 to operate to effect the intake of cool exterior air (and either passively or actively exhaust warm interior air) based upon exterior air conditions, interior air conditions, the usage of the HVAC components 8 during the previous day, and current settings of the HVAC components 8. In other words, based upon these variables, the controller 6 may instruct the HVAC components 8 to intake cool exterior air, and optionally to exhaust warm interior air to decrease the temperature of the interior air of the structure to a temperature between the occupied heating set point and the occupied cooling set point of the HVAC components 8, as shown in FIG. 7.

To capitalize on preferential exterior ambient conditions and achieve greater operating efficiencies, the control scheme 100 is configured, in one exemplary implementation, to operate one or more of the HVAC components 8 using the controller 6 to condition the interior environment. As FIG. 3 shows, the control scheme 100 is initiated at step 102 whereby the controller 6 operates the HVAC components 8 based upon a user's predefined or default operating parameters, and the results of a prior iteration of the control scheme 100. In the exemplary case of cooling the interior air of a building, the control scheme 100 operates during cool mornings to proactively ventilate the building with cool exterior air based upon the operation of the HVAC components 8 during a previous period, e.g., during the previous day.

In one embodiment, the HVAC components 8 may transition between an occupied state and an unoccupied state. In one embodiment, the control scheme 100 is operated only at a predetermined time range. While operating in an occupied state, the controller 6 typically operates to maintain interior air conditions at desired levels, for example, levels directed at maintaining comfortable conditions for occupants, e.g., a user-supplied set point. In one embodiment, while in the predetermined time range, the controller 6 executes the control scheme 100 to maintain interior air conditions at a second set of preferential conditions, which may be directed at a different set of objectives, e.g., energy conservation, equipment wear reduction, and/or improvement of indoor air quality.

In one embodiment, operation of one or more of the HVAC components 8 may be based upon operation that occurred during the previous period. The previous period may be, for example the previous day, i.e., the previous 24 hours. Alternatively, the previous period may be, for example, the previous day less any time duration during which the process 100 operated. For example, if the process 100 operated for two hours during the previous day (for example, from 4:00 am to 6:00 am), the previous period may be 22 hours (i.e., 24 hours minus 2 hours).

At step 104, the controller 6 may execute the control scheme 100 during a predefined operating time range. The controller 6 may then deactivate the control scheme 100 after or outside of the predefined operating time range. The operating time may be between 4:00 am and 6:00 am, for example. In one embodiment, the operating time range may be user-defined. Alternatively, the operating time range may initiate at any suitable predefined time and may last for any suitable predefined duration. In one embodiment, operating time may be defined based upon occurrence of an event. In one embodiment, operating time may begin at any suitable predefined time, and not terminate until block 116 or block 120 of FIG. 3 is "no". In one embodiment, operating time may be defined based upon historical trending of the coolest part of the day. As exemplary, a photocell could be utilized to estimate a time of dawn, and then, in turn, apply that time to the next day's predetermined start and stop times of the operating range. In one embodiment, a start and stop time of the control scheme 100 may be determined based upon monitored exterior air temperature. For example, a time associated with a lowest temperature reading may be set as the start time or a predetermined time period before the monitored lowest temperature may be set as the start time and a predefined duration after the start time may be calculated for the stop time.

At step 106, the control scheme 100 determines a cooling potential of the interior air based upon the previous period, e.g., the previous day. Determining the cooling potential includes determining the cooling usage of the HVAC components 8 from the previous period, e.g., the previous day. More specifically, determining the cooling potential includes adding the sum of the products of cooling load output and run time of the HVAC components 8 from the previous period, which may be calculated using the following equation:

$$cocrt_{\_sum} = (co_1 * crt_1) + (co_2 * crt_2) + \ldots (co_n * crt_n)$$

wherein
co=cooling load output (as a factor of the total possible cooling load output);
crt=the cooling run time of the co (over the run time period of the co);
n=the total number of cooling states in the (user defined) previous period; and
$cocrt_{\_sum}$=the sum of the products of the cooling load outputs (over the time period) and the corresponding cooling run times (over the time period).

To illustrate using example values, if in the previous period the cooling system 14 operated in cooling mode at 50% load output for a period of 30 minutes, and at 100% load output for a period of 180 minutes, then $$cocrt_{\_sum} = (co_1 * crt_1) + (co_2 * crt_2)$$

$cocrt_{\_sum}$=(0.5*30 minutes)+(1*180 minutes), which reduces to: $cocrt_{\_sum}$=(15 minutes)+(180 minutes), which is reduced to: $cocrt_{\_sum}$=195 minutes.

Determining the cooling potential includes determining the heating usage of the heating system 12 from the previous period, e.g., the previous day. More specifically determining the cooling potential includes adding the sum of the products of heating load output and operating time of the heating system 12 from the previous period, which may be calculated using the following equation:

$$hohrt_{\_sum} = (ho_1 * hrt_1) + (ho_2 * hrt_2) + \ldots (ho_n * hrt_n)$$

where
ho=heating load output (as a factor of the total possible heating load output);
hrt=heating run time of the ho (over the run time period of the ho, while ho is in a stable state);
n=the total number of heating states in the user defined time period being measured; and
hohrt_sum=the sum of the products of the heating load outputs (over the time period) and the corresponding heating run times (over the time period).

To illustrate using example values, if in the previous period the heating system 12 operated in heating mode at 50% load output for a period of 30 minutes, and at 100% load output for 180 minutes, then $$hohrt_{\_sum} = (ho_1 * hrt_1) + (ho_2 * hrt_2);$$

$$hohrt_{\_sum} = (0.5 * 30 \text{ minutes}) + (1 * 180 \text{ minutes});$$

$$hohrt_{\_sum} = (15 \text{ minutes}) + (180 \text{ minutes}); \text{ and}$$
$$hohrt_{\_sum} = 195 \text{ minutes}.$$

The cooling potential is calculated by subtracting the sum of the product of the heating load output and the run time ($hohrt_{\_sum}$) from the sum of the cooling load output and run time ($cocrt_{\_sum}$). Specifically, the controller 6 subtracts the $hohrt_{\_sum}$ from the $cocrt_{\_sum}$ to obtain the cooling potential (cp). For example, using the example values above:

If cp (cooling potential)=$cocrt_{\_sum}$−$hohrt_{\_sum}$; If the $hohrt_{\_sum}$=100 minutes;

and

Figure 5:
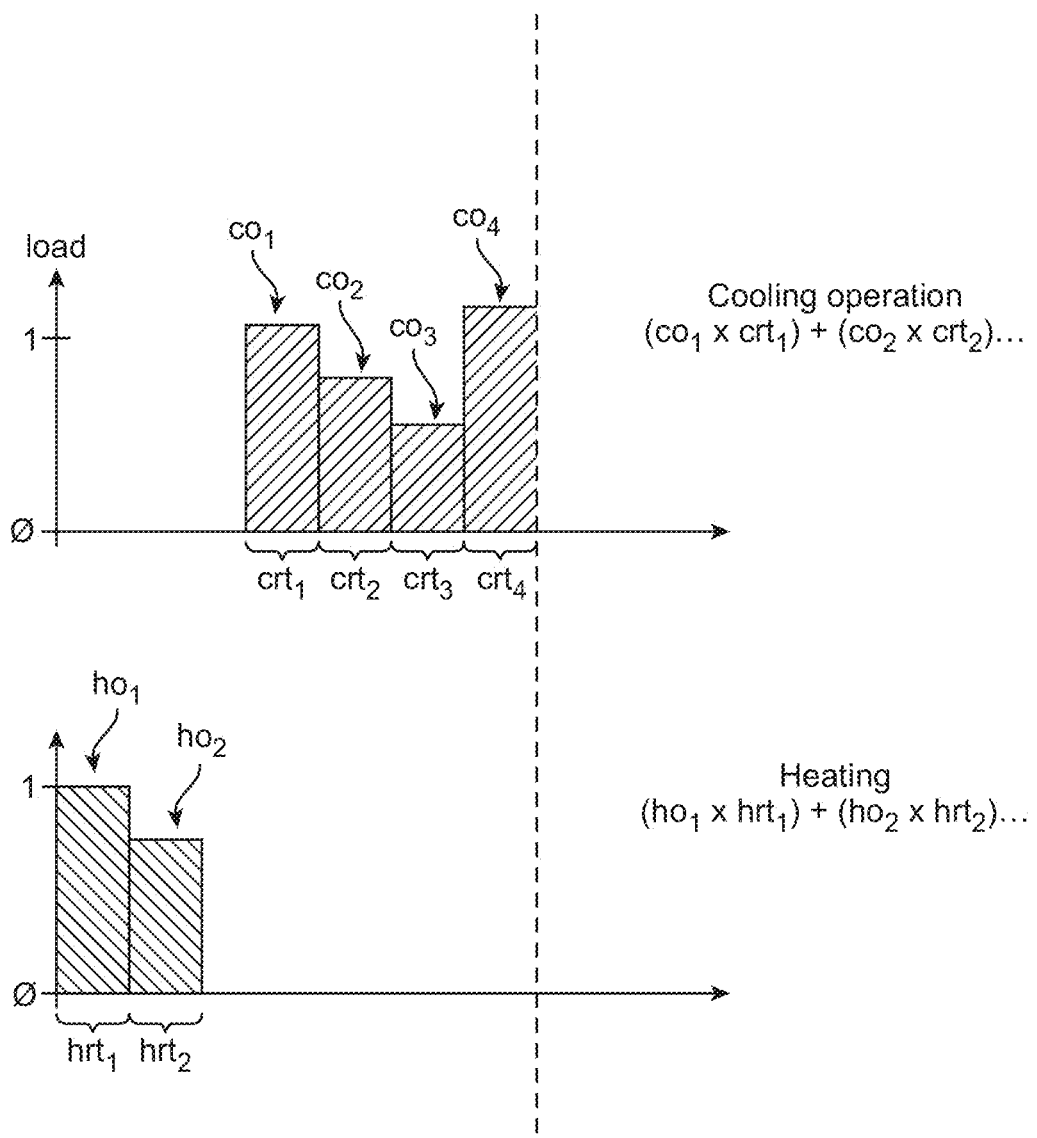
FIGS. 5 and 6 graphically illustrate exemplary occupied operational time ranges and load output for a cooling system and a heating system for calculation of a cooling potential of a building or other structure, in accordance with the present disclosure.
Figure 6:
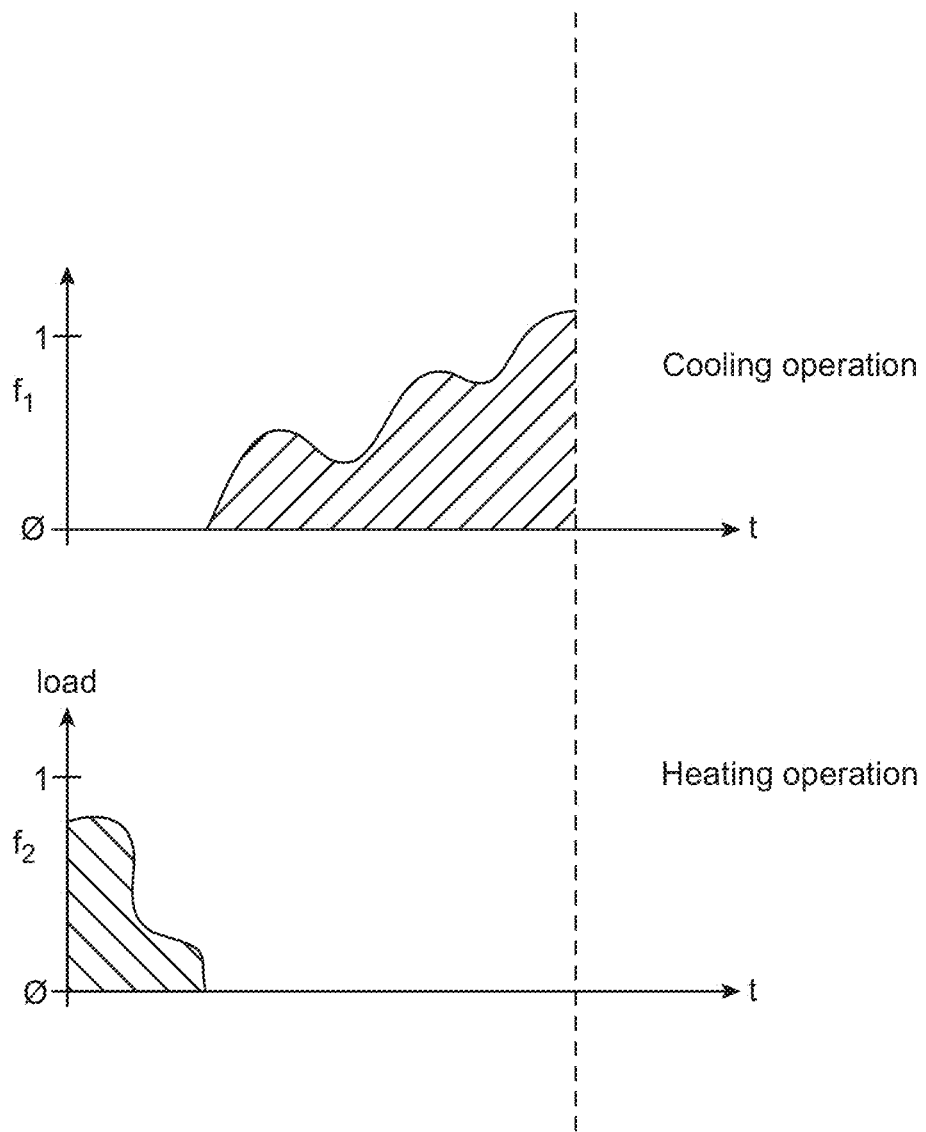

If the $cocrt_{\_sum}$=150 minutes; then cp= $cocrt_{\_sum}$−$hohrt_{\_sum}$ cp=150 minutes−100 minutes; and cp=50 minutes FIGS. 5 and 6 graphically illustrate exemplary time ranges of exemplary operation of a cooling system and a heating system. FIG. 5 graphically shows a first sum of products of operational time and operational load of the cooling system and a second sum of products calculation for operational time and operational load of the heating system. The controller may difference the second sum of products from the first sum of products. A positive result indicates cooling potential, while a zero or negative result indicates no cooling potential.

FIG. 6 shows an alternative to a sum of products calculation. For exemplary embodiments of cooling and heating equipment wherein cooling load output and heating load output are obtained as a function of operating load may be represented with respect to operating time. To determine a cooling potential the controller may execute a first integral calculation for an operational load of the cooling system as a function of operational time over the first time range, execute a second integral calculation for an operational load of the heating system as a function of operational time over the first time range and then difference the second integral from the first integral. Similar to above, a positive result indicates cooling potential, while a negative result indicates no cooling potential.

At step 108, the control scheme 100 subtracts a time bias quanta from the cooling potential (cp). The time bias may be defined or set by the user. This time bias is subtracted from the cooling potential value to inhibit use of the control scheme 100 when only slightly more cooling than heating was observed in the previous period. In such a situation, it is likely that having the equipment cool the structure in the early morning may actually cause the heating function to be energized prior to the "heat of the day," which may be around 3:00 pm. A user defined time bias may be adjusted or may be a default value, but as a default, that value may be set to 60 minutes.

For example, based upon the example values above:

$$entc = cp - time\_bias$$

wherein
time_bias=time bias; and
entc=enable control scheme 100 if positive value.

For example, if cp=50 minutes; and if time_bias is set to 60 minutes (which can be the default value); then entc=50 minutes−60 minutes; and entc=−10 minutes.

At step 110, the control scheme 100 determines whether the entc value is positive or negative. If the entc value is zero or negative, the control scheme 100 stops the process 100 until the next time period 130. In other words, if the entc value is zero or negative (after being biased by the user defined time bias), then conditions may, undesirably, cause the controller 6 to effectuate the heating system 12 during the upcoming period, before the heat of the day, if the control scheme 100 were to ventilate the air in the building. Accordingly, when the entc 110 value is negative, to avoid utilizing the heating system 12 after having cooled the structure, the control scheme 100 is not operated to utilize the exterior air damper 22, and/or fan 16 to intake outdoor air and/or the exhaust fan(s) 37 to exhaust interior air thereby avoiding cooling the structure undesirably and avoiding inefficient use of the heating system 12 during the upcoming time period.

At step 112, the control scheme 100 measures indoor and outdoor air conditions. At step 114, the control scheme 100 adjusts an exterior air temperature measurement using a user-defined or default temperature bias. Factoring in a temperature bias will cause the controller 6 to be less likely to determine that the exterior air is suitable to use for cooling the structure. The greater the temperature bias, the less likely the controller 6 will find the exterior air suitable. The temperature bias is added to compensate for electrical consumption of the equipment which operates during the control scheme 100 to cool the structure. For example, while running the fan(s) 16 alone consumes less electricity than running a number of the other HVAC components 8, e.g., compressors, condenser fans, etc., there is still energy consumption used by simply running the fan 16. The "break even" point for venting the exterior air is not when the exterior air temperature or enthalpy is slightly less than that of the interior air temperature or enthalpy, respectively, but is when the interior air temperature or enthalpy is significantly greater than the exterior air temperature or enthalpy, respectively, so that the cost to utilize the intake of exterior air and the exhausting of indoor air (either passively or actively) for cooling is profitable, in terms of the cost per BTU of heat transfer (or electricity consumption per BTU of heat transfer). Based on factors including, but not limited to, indoor air humidity set points, fresh air intake considerations, specific equipment characteristics, and the local cost of electricity, the optimal temperature or enthalpy difference may change. Enthalpy of the exterior air may be determined or estimated using exterior temperature and humidity measurements from the exterior temperature sensor 31 and the exterior humidity sensor 32 using known calculation techniques and/or modeling processes.

At step 116, subsequent to determining that the entc value is positive the control scheme 100 analyzes the exterior ambient air to determine whether the exterior air is suitable. The determination of whether the exterior air is suitable may be based upon the use of industry standard enthalpy calculations, or temperature calculations, or some combination of the two. Specifically, the interior air condition and exterior air condition is measured. The suitability may be based upon interior and exterior air temperature and, optionally, humidity values, provided by the sensors, such as interior temperature sensor 35, exterior temperature sensor 31, interior humidity sensor 36, and exterior humidity sensor 32, network values, etc., or may simply utilize interior and exterior air temperature sensors 35 and 31, respectively, network values, etc. If the controller 6 determines that the exterior air is not suitable for intake, then the control scheme is stopped at 130 and the controller 6 does not operate the damper(s) 22 and 23 and the fan 16 to intake exterior air, and optionally the exhaust fan(s) 37 to exhaust interior air.

At step 118, subsequent to determining that the exterior air is suitable for cooling (or economization), the controller 6 determines a night time cooling set point. The night time cooling set point is determined by subtracting the occupied heating set point, e.g., a "heating" set point on a conventional thermostat, from the occupied cooling set point, e.g., a "cooling" set point on a conventional thermostat, multiplying that value by a bias value (between 0 and 1, with a default of 0.67, for example), and then subtracting that product from the occupied cooling set point. The bias value may be used, for example, to affect the degree of pre-cooling within the building, with a larger biasing value resulting in more pre-cooling and a smaller biasing value resulting in less pre-cooling. For example, the following equation applies:

$$ntcsp = ocsp - (ocsp - ohsp) * udbv$$

wherein
ntcsp=night time cooling set point; ocsp=occupied cooling set point;

ohsp=occupied heating set point; and udbv=user defined bias value.

Example values are applied to this equation: If ocsp=70 F; If ohsp=65 F; and udbv=0.67; then ntcsp=ocsp−(ocsp−ohsp)*udbv: ntcsp=70 F−(70 F−65 F)*0.67; ntcsp=70 F−5 F*0.67; ntcsp=70 F−3.35 F; and ntcsp=66.65 F.

As explained below, with respect to FIG. 4 and control scheme 200, alternatively to utilizing only temperature values to determine the ntcsp, when humidity values are available, enthalpy values could be entered in place of temperature values to determine the ntcsp. In such a case, the value of the ntcsp could be expressed in terms of enthalpy rather than simple temperature. Likewise, alternatively to utilizing only temperature values to determine the result of step 120, when humidity values are available, indoor air enthalpy and outdoor air enthalpy could be used rather than simple temperatures.

At step 120 the control scheme 100 has determined the ntcsp, it compares the ntcsp with the interior air temperature. If the interior air temperature is less than or equal to the ntcsp, then the control scheme 100 terminates all sequences 130.

At step 122, if the interior air temperature is greater than the ntcsp, then the control scheme 100 energizes, for example, a relay, triac output, network signal, etc., which will, at least, energize equipment which causes cool outdoor air to enter the building, e.g., the fan 16, and open the exterior air damper 22 (also known as the fresh air damper 22). The control scheme 100 may energize any connected exhaust equipment such as the exhaust fan(s) 37, which may remove air from the building, to help facilitate economization of the primary heating, cooling, and ventilation equipment. The relay, triac output, network signal, etc. will remain active until conditions change in blocks 110, 116, or 120. In one embodiment, the controller will terminate step 122 if the controller 6 is transitioned to an occupied state. In one embodiment, the controller 6 will terminate step 122 if a current time is outside of the predefined time range.

At various points in the control scheme 100, the controller 6 may transition the one or more of the HVAC components 8 to a stopped operating state 130. The control scheme 100 may be configured to transition out of step 130 after a predefined duration of time or upon occurrence of an event.

Figure 4:
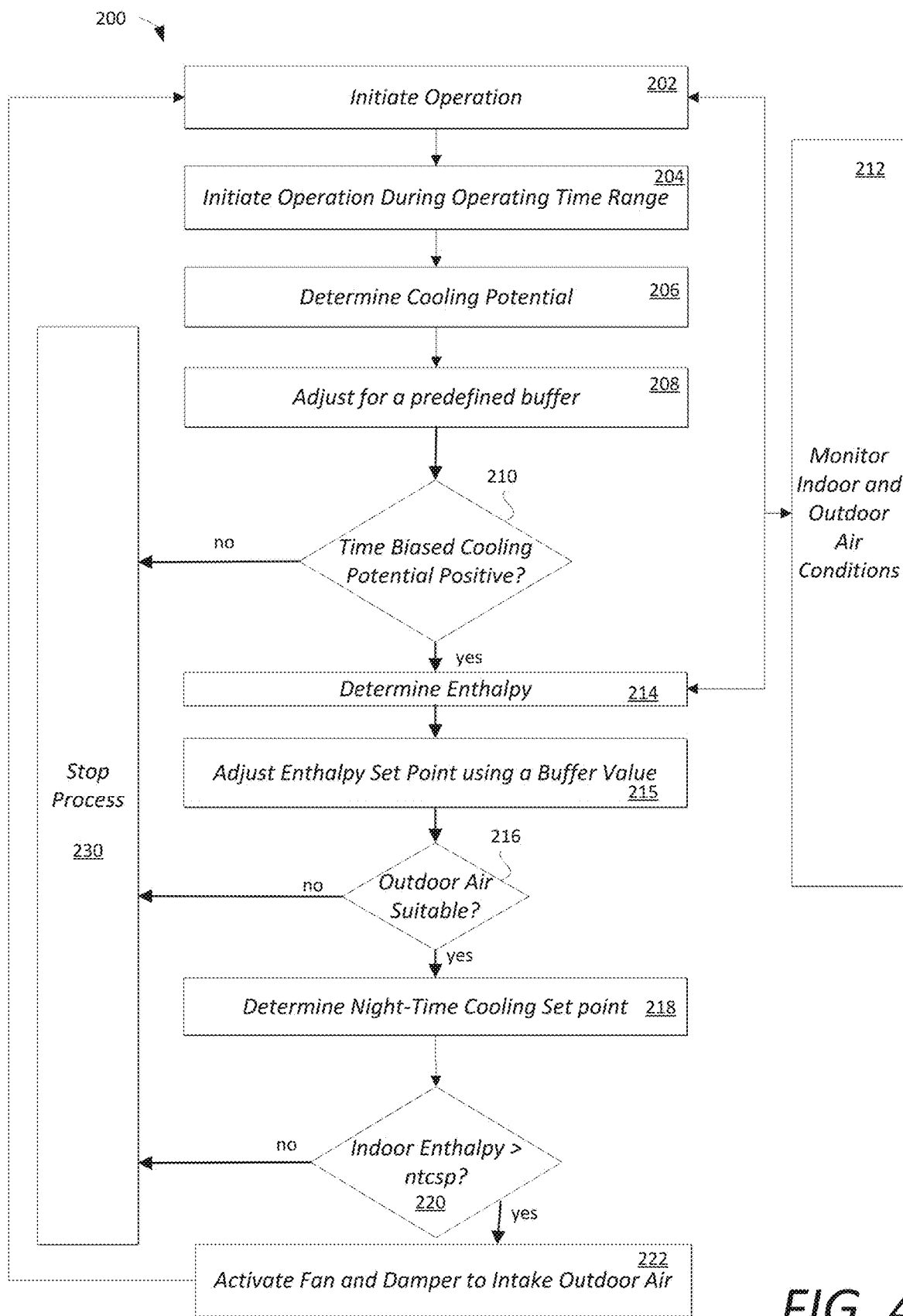
FIG. 4 is a control scheme for operating the exemplary HVAC system using enthalpy values, in accordance with the present disclosure.

FIG. 4 shows a control scheme 200 for operating the controller 6 and the HVAC components 8 illustrating operation of the system 10 using enthalpy values determined from temperature and humidity measurements. Although the control scheme 200 is shown as discrete elements, such an illustration is for ease of description and it should be recognized that the functions performed by the control scheme 200 may be combined in one or more devices, e.g., implemented in software, hardware, and/or application-specific integrated circuitry (ASIC) and executed, in some cases, concurrently or in parallel. For example, monitoring of the various sensors may be executed concurrent with any number of execution steps.

The control scheme 200 is directed at operating efficiencies that can be gained from utilizing exterior ambient conditions to ventilate outside air into the structure and/or condition the interior environment. For example, during warm summer months, the coldest part of the day is typically in the early morning, such as between 4:00 am and 6:00 am. As set forth further below, during this early morning time, the controller 6 instructs one or more of the HVAC components 8 to operate to effect the intake of cool exterior air (and either passively or actively exhaust warm interior air) based upon exterior air conditions, interior air conditions, the usage of the HVAC components 8 during the previous day, and current settings of the HVAC components 8. In other words, based upon these variables, the controller 6 may instruct the HVAC components 8 to intake cool exterior air, and optionally to exhaust warm interior air to decrease the temperature of the interior air of the structure to a temperature between the occupied heating set point and the occupied cooling set point of the HVAC components 8, as shown in FIG. 7.

To capitalize on preferential exterior ambient conditions and achieve greater operating efficiencies, the control scheme 200 is configured, in one exemplary implementation, to operate one or more of the HVAC components 8 using the controller 6 to condition the interior environment. As FIG. 4 shows, the control scheme 200 is initiated at step 202 whereby the controller 6 operates the HVAC components 8 based upon a user's predefined operating parameters, e.g., set points, and the results of a prior iteration of the control scheme 200. In the exemplary case of venting exterior air into an interior of the structure, the control scheme 200 operates during cool mornings at predefined or determined times to proactively ventilate the building with cool exterior air based upon the operation of the HVAC components 8 during a previous period, e.g., during the previous day.

At step 204, the controller 6 may execute the control scheme 200 during a predefined operating time range, a predefined time duration having a determined start time based upon prior measured exterior air conditions and/or photocell measurements.

At step 206, the control scheme 200 determines a cooling potential of the interior air based upon the previous period, e.g., the previous day, similar to step 106 described herein above with respect to control scheme 100.

At step 208, the control scheme 200 subtracts a time bias or buffer value from the determined cooling potential (cp). This time bias is subtracted from the cooling potential value to prohibit use of the control scheme 200 when only slightly more cooling than heating was observed in the previous period.

At step 210, the control scheme 200 determines whether the entc value is positive or negative or zero. The entc value is the difference between the cooling potential value and the time bias or buffer value. If the entc value is zero or negative, the control scheme 200 stops the process 200 until the next time period by transitioning the control scheme 200 to a stop state 230.

At step 212, the control scheme 200 measures interior and exterior air conditions including an exterior temperature and exterior humidity. At step 214, the control scheme 200 determines the exterior enthalpy using the monitored exterior air conditions including temperature and humidity. Enthalpy of the exterior air may be determined or estimated using exterior temperature and humidity measurements from the exterior temperature sensor 31 and the exterior humidity sensor 32 using known calculation techniques and/or modeling processes.

At step 215, the control scheme 200 adjusts the determined enthalpy value using a buffer value. Factoring in a buffer will cause the controller 6 to be less likely to determine that the exterior air is suitable to use for cooling the structure. The greater the buffer value, the less likely the controller 6 will find the exterior air suitable. The buffer value is added to compensate for electrical consumption of the equipment which operates during the control scheme 200 to cool the structure. For example, while running the fan(s) 16 alone consumes less electricity than running a number of the other HVAC components 8, e.g., compressors, condenser fans, etc. in combination with each other, there is still energy consumption used by simply running the fan 16. The "break even" point for venting the exterior air is not when the exterior air temperature or enthalpy is slightly less than that of the interior air temperature or enthalpy, respectively, but is when the interior air temperature or enthalpy is significantly greater than the exterior air temperature or enthalpy, respectively, so that the cost to utilize the intake of exterior air and the exhausting of indoor air (either passively or actively) for cooling is profitable, in terms of the cost per BTU of heat transfer (or electricity consumption per BTU of heat transfer). Based on factors including, but not limited to, indoor air humidity set points, fresh air intake considerations, specific equipment characteristics, and the local cost of electricity, the optimal temperature or enthalpy difference may change.

At step 216, subsequent to determining that the entc value is positive the control scheme 200 analyzes the exterior ambient air to determine whether the exterior air is suitable. The determination of whether the exterior air is suitable may be based upon the use of industry standard enthalpy calculations, or temperature calculations, or some combination of the two. In one embodiment, the interior humidity value and exterior humidity values are compared. If the controller 6 determines that the exterior air is not suitable for intake, e.g., interior conditions are preferable to exterior conditions, then the control scheme 200 is stopped at 230 and the controller 6 does not operate the damper(s) 22 and 23 and the fan 16 to intake exterior air, and optionally the exhaust fan(s) 37 to exhaust interior air.

At step 218, subsequent to determining that the exterior air is suitable for venting exterior air to the interior of the structure, the controller 6 determines a night time enthalpy cooling set point similarly to the process described herein above with respect to control scheme 100 only using enthalpy values and not exclusively temperature values. The night time cooling set point 218 is determined by subtracting the occupied enthalpy heating set point, from the occupied enthalpy cooling set point, and then multiplying that value by a bias value (between 0 and 1, with a default of 0.67, for example), and then subtracting that product from the occupied enthalpy cooling set point. For example, the following equation applies:

$$ntcsp = ocsp - (ocsp - ohsp)*udbv$$

wherein
ntcsp=night time cooling set point; ocsp=occupied enthalpy cooling set point;
ohsp=occupied enthalpy heating set point; and udbv=user defined bias value.

At step 220 the control scheme 200 has determined the ntcsp, it compares the ntcsp with the interior enthalpy. If the interior air enthalpy is less than the ntcsp, then the control scheme 200 terminates all sequences by transitioning to block 230.

At step 222, if the interior air enthalpy is greater than the ntcsp, then the control scheme 200 energizes, for example, a relay, triac output, network signal, etc., which will, at least, energize equipment which causes cool outdoor air to enter the building, e.g., the fan 16, and open the exterior air damper 22. The process may energize any connected exhaust equipment, which may remove air from the building, to help facilitate economization of the primary heating, cooling, and ventilation equipment. The relay, triac output, network signal, etc. will remain active until conditions change in blocks 210, 216, or 220. In one embodiment, the controller will terminate step 222 if the controller 6 is transitioned to an occupied state. In one embodiment, the controller 6 will terminate step 222 if a current time is outside of the predefined time range.

At various points in the control scheme 200, the controller 6 may transition the one or more of the HVAC components 8 to a stopped operating state 230. The control scheme 200 may be configured to transition out of step 230 after a predefined duration of time or upon occurrence of an event.

FIG. 7 graphically shows operation of the HVAC system for venting exterior air into a structure with respect to indoor temperature, while outdoor air is suitable for cooling 116. As FIG. 7 shows, specific condition ranges related to the structure's interior and monitored exterior temperature result in venting exterior air to the interior of the structure. In one embodiment, venting of the exterior air to the inside will occur when: (1) the time biased cooling potential is positive; and (2) the indoor temperature is greater than a cooling set point associated with an unoccupied status of the structure, i.e., (second time range). As illustrated in FIG. 7, the criteria for venting of the exterior air to the inside is satisfied in zone 300.

As set forth above, in one embodiment the controller 6 may utilize a thermostat of the HVAC components 8. For example, when the controller 6 utilizes a conventional thermostat of the HVAC components 8, the following is typical with most conventional thermostats: G terminal=fan 16 on; Y1 terminal=cooling first stage; Y2 terminal=cooling second stage; W1 terminal=heating first stage; W2 terminal=heating second stage.

A capacitor may be set to charge when the Y1 terminal is activated, with a resistor inline with the capacitor, which acts as a regulator for the current. The same capacitor could also be charged when the Y2 terminal is activated, which would also have an inline "regulator" resistor. Likewise, the heating terminals could also have a capacitor which is charged via the W1 and W2 terminals, with "regulating" resistors in-line. The charges of the two capacitors would be discharged via a short, which is regulated by a (high value) resistor. At the initiation time of the control scheme 100, e.g., 4:00 am, the total charges of each of the two capacitors could be compared via an integrated circuit (IC) to determine the cooling potential (as set forth above) for the upcoming time period. The time bias could be incorporated by adding a potentiometer to the circuit. When used in this configuration, some level of circuit integration could be added. For example, a time clock of the thermostat may be incorporated into the process. Similarly, the occupied set points (or at least the lowest cooling set point) may be incorporated into the process.

In one embodiment, interior humidity and exterior humidity sensors are optional, and a provision may be made to utilize both or only one type of humidity sensor. In one exemplary application using only an exterior humidity sensor, the system 10 utilizes a default, predefined humidity reading as a reference marker to compare measurements from the exterior humidity sensor. For example, the system 10 may be configured to assume that the interior humidity is at a first predefined level under a first set of criteria, e.g., a reading from the exterior humidity sensor after running the control scheme 100 for at least a first time period. Another example, may assume that the interior humidity is simply at a predefined level. During operation, the system 10 could compare the assumed humidity value and the measured value until the exterior humidity levels exceed 50% relative humidity, at which point the assumed interior humidity level would stay at 50%, while the actual relative humidity value for the exterior humidity levels would be reflected in the system's 10 calculations. In one embodiment, the control scheme 100 may stop if the exterior humidity is above and/or below a predetermined threshold.

On thermostat embodiments having a switch to select "cool" (only) or "heat" (only), there could be a calculated or user-defined ntcsp (see above). The calculated ntcsp could use a user defined temperature offset value which may be set via programming the thermostat, or may simply use a default value of a certain number of degrees less than the lowest cooling set point on the thermostat.

Figure 8A:
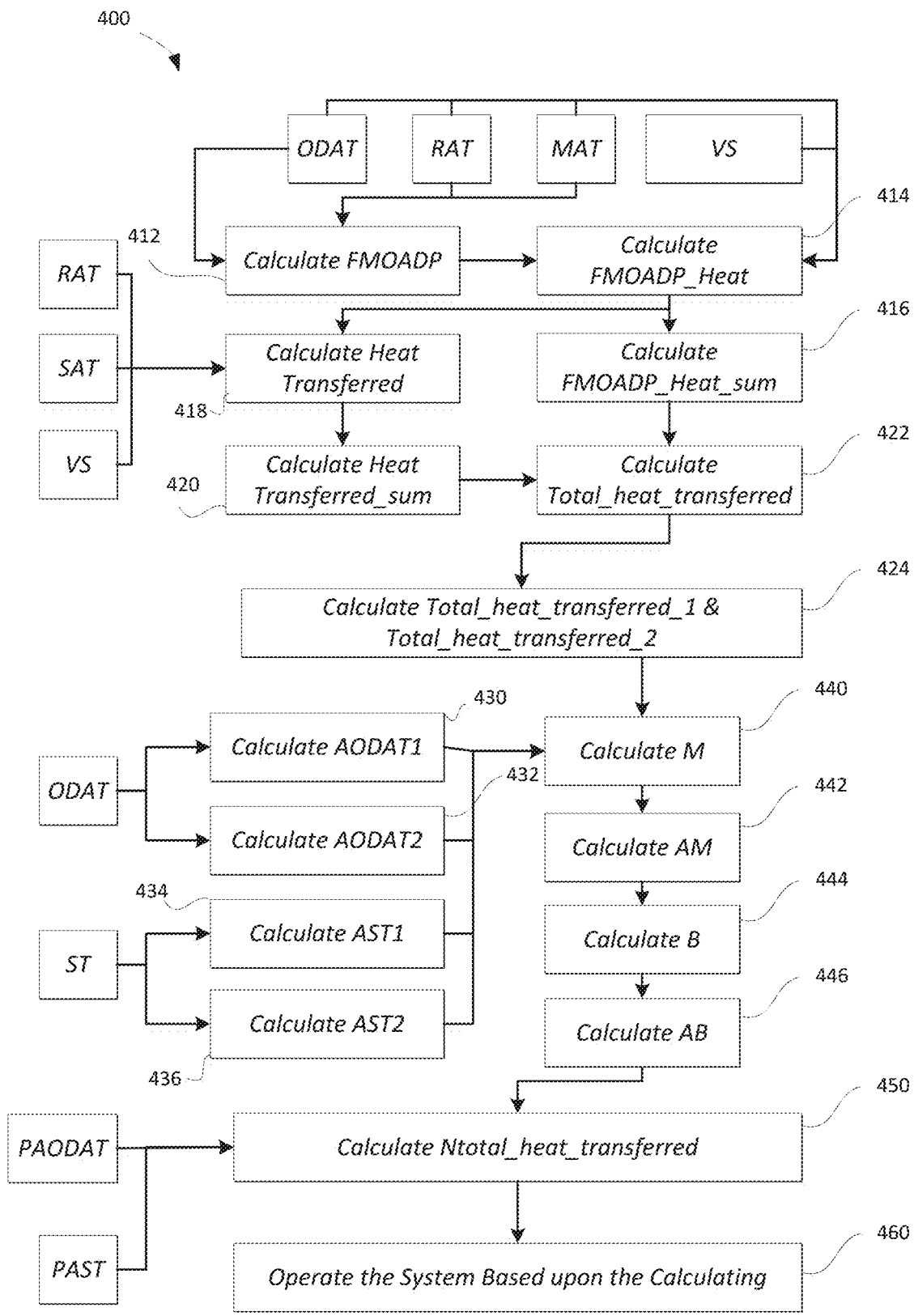
FIGS. 8A and 8B are control schemes for operating the temperature control system, in accordance with the present disclosure.

FIG. 8A shows a block diagram illustrating an exemplary process 400 for controlling the system 10 based upon a calculated anticipated heat energy transfer metric. Although FIG. 8A may show a specific order of method steps, the order of the steps may differ from what is depicted. Unless specifically stated, the methods or steps shown in the flowcharts and described in the accompanying text are not constrained to a particular order or sequence. In various embodiments, some of the steps thereof can occur or be performed concurrently or with partial concurrence and not all the steps have to be performed in a given implementation depending on the requirements of such implementation. Further, the order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure. All such variations are within the scope of the disclosure.

At step 412 of the process 400, operating of the system 10 may include determining a fixed or minimum outdoor air damper position (FMOADP) using any one of the following equations:

$$FMOADP=(RAT-MAT)/(RAT-ODAT)$$

$$FMOADP=(MAT-RAT)/(ODAT-RAT)$$

$$FMOADP=1-((ODAT-MAT)/(ODAT-RAT))$$

$$FMOADP=1-((MAT-ODAT)/(RAT-ODAT))$$

where
ODAT represents an outdoor air temperature which can be measured using sensor 31, and
RAT represents a return air temperature, which may be measured from sensor 33, and
MAT represents a mixed air temperature measured from sensor 39.

For example, if MAT=55° F., ODAT=50° F., and RAT=70° F., then FMOADP=(70° F.−55° F.)/(70° F.−50° F.), which equals a value of 0.75, meaning that the outdoor air damper 22 is open 75%, where a '1' value is defined as completely open and a '0' value is defined as closed.

In various embodiments, a discharge air temperature may be utilized to determine FMOADP instead of the MAT variable as one skilled in the art will recognize upon a careful reading of the teachings herein.

In various embodiments, the FMOADP could be calculated and trended (based on time or time in different states/values) for use later. For example, specific calculations of FMOADP at noon and at 2 pm, may be trended to determine position at 1 pm or 3 pm. In one embodiment, the FMOADP may be used in calculating the energy (or heat) added to, or removed from the structure via the "fresh air intake", or intake of outdoor air.

Additionally, heat transfer due to FMOADP and ventilation status (VS) may be calculated when considering temperatures. In various embodiments, depending on operating parameters of the system 10, historical heat transfer rates due to the intake of outdoor air may be used to predict the heat transfer going forward. For example, the heat transferred during the last same day of the previous week could be used to determine another day's anticipated value, or may begin as the average heat transferred the last same day of the week and month for the first year, and/or then in later years, the average heat transferred on the same day of the week and month in preceding years. In one exemplary application, a church might have nominal load demand on every day of the week except Sunday. Basing the next day's predicted cooling potential based on the last Sunday's actual load demand, or on the same Sunday from the previous year's load demand may be beneficial instead of using the prior day's load demand.

In one embodiment, if multiple systems with different maximum volumetric flow rates are used, then a "VS constant" can be multiplied by each individual climate control equipment's value for VS, such that the value of VS for each individual climate control equipment shall be in proportion to its volumetric flow rate in relation to all other climate control equipment. For example: If two pieces of climate control equipment are used, one capable of moving 4,000 CFM (unit #1), and another capable of moving 8,000 CFM (unit #2), then the VS constant for unit #1 would be 0.5, and the VS constant for unit #2 would be 1.

At step 414 of the process 400, a numeric value for the variable representing the heat transfer due to bringing outdoor air into and expelling indoor air out of a structure may be determined, iteratively at predetermined sampling intervals, e.g., at a time interval as follows, while understandably similar calculations could be made by replacing the temperature variables for enthalpy variables and modifying the equations slightly:

$$FMOADP\_heat=VS*(ODAT-RAT)*FMOADP$$

where
FMOADP_heat=the heat transfer metric due to bringing outdoor air into and expelling indoor air out of a structure,
ODAT represents an outdoor air temperature,
FMOADP represents a fixed or minimum outdoor air damper position,
RAT represents a return air temperature or exhaust air temperature, and
VS represents an operating status of the ventilation system 16 (e.g., 0=off, 1=on 100%, 0.5=50% output, etc.).

For example: If ODAT=60° F., FMOADP=0.1 (i.e., 10%), RAT=70° F., VS=1 (on), then FMOADP_heat=1*(60° F.−70° F.)*0.1, which reduces to −1° F.

At step 416, the system 10 may determine FMOADP_Heat_sum. FMOADP_Heat_sum represents a heat transferred (based on the FMOADP_heat metric), resulting from venting outdoor air into, and indoor air out of, the building structure for the entire period being measured (e.g., a whole day, 22 hours, one week, etc.). In exemplary applications having multiple climate control equipment (i.e. air conditioners, exhaust fans, etc.) within a building structure or zone, the FMOADP_Heat_sum can be summed with the FMOADP_Heat_sum of the other networked and/or controlled systems, however, the FMOADP_heat calculation of each individual unit would likely need to have a "VS constant" (as described above) applied to the FMOADP_heat value for each individual unit. FMOADP_Heat_sum could be calculated as follows:

$$FMOADP\_Heat\_sum \approx \sum_{i=1}^{z} x_i t_i$$

where
x represents FMOADP_heat,
$t_i$ represents a predetermined time interval,
FMOADP_heat represents the heat transfer metric (as defined above) due to bringing outdoor air into and expelling indoor air out of a structure,
i represents an interval,
z represents a number of preset timed intervals during the period (the period usually being 22 or 24 hours, but could be 6 hours, etc.) wherein each measure of FMOADP_heat is taken.

Similarly, FMOADP_Heat_sum may be calculated using an integral calculation:

$$\text{FMOADP\_Heat\_sum} = \int_a^b \text{FMOADP\_heat}(t)\,dt$$

where
a=the beginning of the time period,
b=the end of the time period, and
t=time.

At step 418 of the process 400, the system 10 may calculate a heat transfer metric (HeatTransferred) due to a HVAC unit's operation of mechanical heating or cooling (e.g. using gas burners, refrigerant based systems, etc.), iteratively at predetermined sampling intervals, e.g., at a time interval as follows, while understandably similar calculations could be made by replacing the temperature variables for enthalpy variables and modifying the equations slightly. The operation of the mechanical cooling or mechanical heating is preferably considered to ascertain the heat transfer into or out of a structure during a period of time. In a situation where the volumetric air flow (in cubic feet per minute (CFM)) is known, the energy transferred may be fairly easily calculated, however, in a situation where the CFM is unknown, and for the purposes of the disclosure, the total heat transfer, as a result of a HVAC unit's mechanical operation, (e.g., use of gas burners for heating, refrigeration based cooling systems, compressors, etc.) may require the formation of a new metric.

The variable 'HeatTransferred' represents a heat transfer metric, due to a HVAC units operation of mechanical heating and/or cooling, but not including the heat energy transferred due to bringing outdoor air into, and expelling indoor air out of a structure, and may be determined by:

$$\text{HeatTransferred} = VS*(SAT-RAT) - \text{FMOADP\_heat}$$

where
SAT represents a temperature of the supply air from sensor 38,
RAT represents a temperature of the return air which may be obtained from sensor 33, and
FMOADP_heat=the heat transfer metric (as defined above) due to bringing outdoor air into, and expelling indoor air out of a structure.

For example, if SAT=100° F., RAT=70° F., VS=1 (on), and FMOADP_heat=−1° F., then: HeatTransferred=1*(100° F.−70° F.)−(−1° F.) which reduces to HeatTransferred=31° F.

Figure 8B:
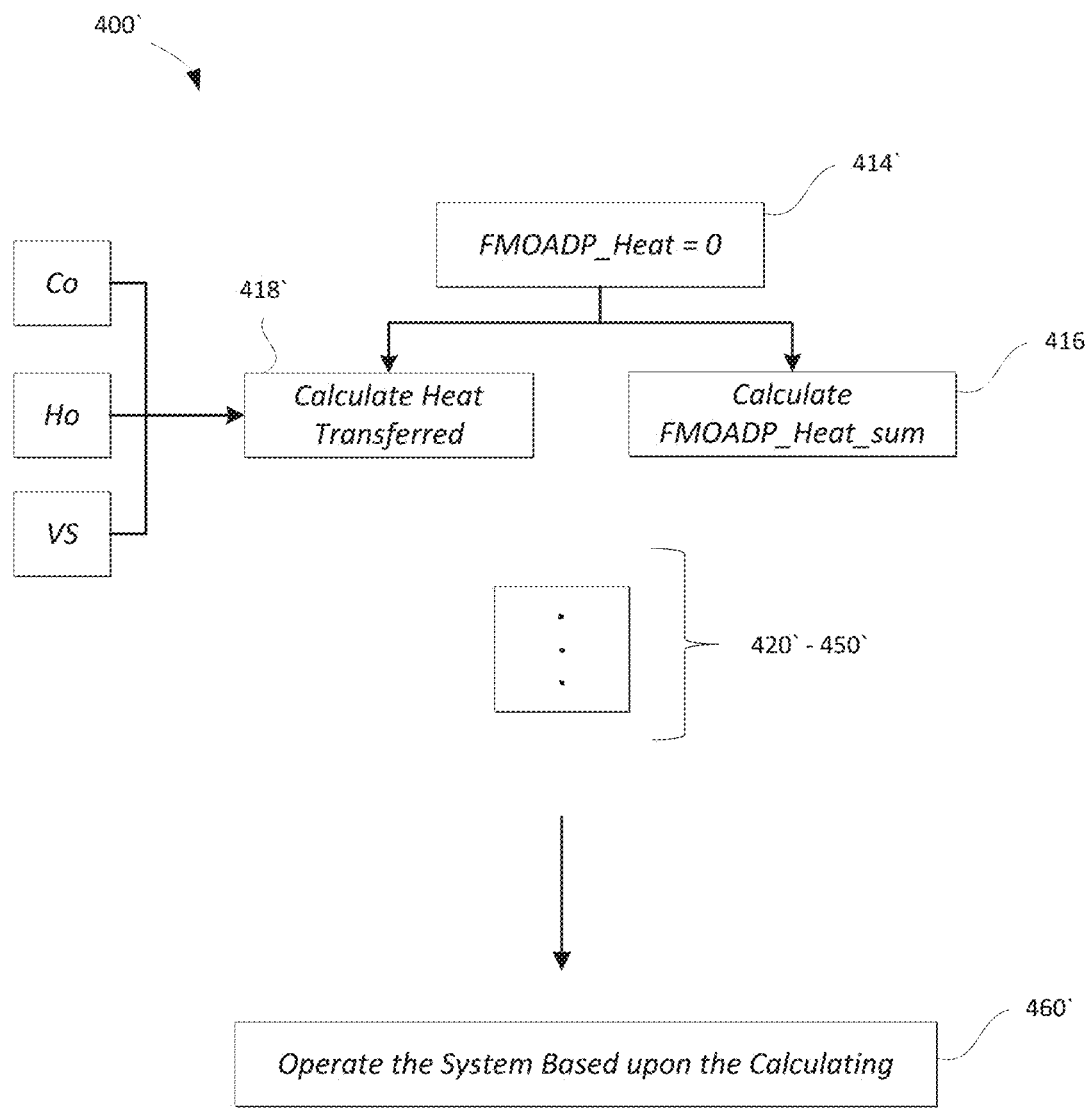

FIG. 8B shows an alternative process 400' for implementation in the system 10 without sensors 31, 33, 38, and 39 being used for calculating HeadTransferred at step 418'. In one embodiment, HeatTransferred may be calculated as follows: HeatTransferred=VS*(Ho−Co), wherein FMODAP_heat is equal to zero (step 414'); and Ho represents heating load output and Co represents cooling load output as described hereinabove with reference to FIG. 3. FMOADP_Heat_sum is then calculated at step 416' based upon a FMOADP_heat having a 0 value. As one skilled in the art may understand after considering the teachings disclosed herein that the units of measurement will change from degree-minutes to minutes. Such embodiments using this alternative calculation for HeatTransferred shall also affect the processes, equations, and conclusions given in some parts this disclosure, however, it should be noted that alternative calculations for HeatTransferred and/or Total_heat_transferred (described below) to operate the system 10 at step 460', when used in conjunction with the teachings herein disclosed, could effectively be used as understood by those skilled in the art upon a careful reading of the teachings herein.

Step 420 of the process 400 may include determining the heat transferred due to the mechanical operations, e.g., gas burners, refrigeration circuits, etc., but excluding the heat energy transferred due to introducing outdoor air into, and expelling indoor air out of the structure. This value may be calculated for a predefined period (i.e. a whole day, 22 hours, a week, etc.), wherein the calculation is computed once per interval, and then summed, which may then be represented by the variable: HeatTransferred_sum, which may then be calculated by:

$$\text{HeatTransfered\_sum} \approx \sum_{i=1}^{z} x_i t_i$$

where
i represents an interval or iteration,
$t_i$ represents a predetermined time interval
x represents HeatTransferred, and
z represents a number of preset timed intervals during the period (the period usually being 22 or 24 hours, but could be 6 hours, etc.) wherein each measure of HeatTransferred is taken.

Alternatively, the HeatTransferred_sum could be calculated by:

$$\text{HeatTransferred\_sum} = \int_a^b \text{HeatTransferred}(t)\,dt$$

where
a=the beginning of the time period,
b=the end of the time period, and
t=time In one embodiment, of a structure having a plurality of networked systems, a separate HeatTransferred_sum may be determined for each system and then may be added together.

Subsequent to calculating the HeatTransferred_sum, the process 400 calculates a Total_heat_transferred (at step 422) by adding HeatTransferred_sum with FMOADP_Heat_sum. Total_heat_transferred then represents a total °F.−minutes of heat transferred into the structure by the HVAC unit during the time period (i.e. 22 hours, 24 hours, one week, etc.). For example: if HeatTransfered_sum=500° F.−minutes, FMOADP_Heat_sum=−400° F.−minutes, then Total_heat_transferred=500° F.−minutes+(−400° F.−minutes)=100° F.−minutes.

In the above example, the heat energy was transferred into the structure (the heating system 12 was operated to introduce heat into the structure). If the value would have been negative, then heat energy would have been transferred out of the structure by the system 10 via one or more of the components, e.g., the ventilation system 16.

Once the total_heat_transferred has been determined, it can be used to determine the slope M 440, which in turn can be used to predict the next period's heat transfer (NTotal_heat_transferred 450). To determine M, the total_heat_transferred for at least two historic time periods can be calculated (i.e. two days, two 6 hour periods, two weeks, or whatever period is determined to be most effective in predicting the next period's heat transfer desired). The total_heat_transferred for the first historic time period could be total_heat_transferred_1, and for the second historic time period could be called total_heat_transferred_2, and so on, as determined in step 424.

If the volumetric flow rate of the air, based on VS is known, then one skilled in the art may calculate the heat transfer in British Thermal Units (BTU) of HeatTransferred, FMOADP_Heat_sum, and Total_heat_transferred. Integrating the calculations into the system to provide for automated calculations of HeatTransferred_sum versus FMOADP_Heat_sum would prove beneficial in terms of analyzing deficiencies in equipment configurations/damper settings (i.e. if a structure was drawing in excessive amounts of outdoor air, etc.).

The process 400 further includes determining an average outdoor air temperature for a period (AODAT) at steps 430 and 432.

AODAT could be calculated by:

$$AODAT \cong (\Sum_{i=1}^{z} x_i)/z$$

where
AODAT represents an average outdoor air temperature for a period,
z represents a number of preset timed intervals during the period (the period is usually 22 or 24 hours, but could be 6 hours, etc.),
x represents an outdoor air temperature, and
i represents a predetermined time interval
Alternatively, AODAT may be calculated by:

$$AODAT = (\int_a^b f(x)dx)/(b-a)$$

where
f(x) represents a function of AODAT measurements over the time period a to b,
a represents a beginning of the time period, and
b represents an end of the time period.

At steps 434 and 436 of the process 400, iterations of the average space temperature inside the structure, e.g., AST1, AST2, etc., may be calculated by:

$$AST \cong (\Sum_{i=1}^{z} x_i)/z$$

where
AST represents the average space temperature for a period,
z represents a number of preset timed intervals during the period (the period usually being 22 or 24 hours, but could be 6 hours, etc.) wherein each measure of the space temperature set point is taken,
x represents ST, which is a space temperature measurement made by sensor 35, and
i represents a predetermined time interval.
Alternatively, the AST could be calculated by:

$$AST = (\int_a^b f(x)dx)/(b-a)$$

where
AST represents an average space temperature for a period,
f(x) represents a function of AST measurements over the time period a to b,
a represents a beginning of the time period,
b represents an end of the time period, and
x represents ST, which is a space temperature measurement made by sensor 35.

Considering that it's reasonable to assume that a structure or zone with no internal heat sources, e.g., lights, people, computers, etc., that has zero influence from radiant heat, e.g., from the sun, that is not affected by the differential temperatures of materials inside or of the building structure, e.g. the concrete floor, etc., that there is no differential temperature between the inside of the structure and the earth, and assuming (for purposes of the process 400), that the HVAC equipment, e.g., the exhaust fans 37 and the supply air fans 16, do not add heat energy to the structure, it's reasonable to assume that the structure's Total_heat_transferred≅0, if the ASTSP=AODAT=AST, where
ASTSP represents the average space temperature set point for a period,
AODAT represents the average outdoor air temperature for a period, and
AST represents the average space temperature for a period.

Because outdoor air temperatures vary during the course of a period it is beneficial to sample certain variables and values throughout the day. As indicated herein above, Total_heat_transferred=HeatTransferred_sum+FMOADP_Heat_sum. As expressed herein above, a 22 hour, 24 hour, period may be used to define a "day" or "period", however it should be understood that when determining a slope of a graph, it may be beneficial to use different time periods. For example: While it is understood that HeatTransferred_sum and FMOADP_Heat_sum can use identical time periods for determining Total_heat_transferred, and any equations that combine HeatTransferred_sum, FMOADP_Heat_sum, Total_heat_transferred, AODAT, and AST will likely require that identical time periods be used, it should also be understood that in the application of determining the slope ((AODAT$_2$−AST$_2$)−(AODAT$_1$−AST$_1$))/(Total_heat_transferred$_2$−Total_heat_transferred$_1$) that smaller time periods may be more suitable, e.g., a 6 hour time period, although the disclosure herein contemplates that various time periods may be utilized consistent with the teachings herein.

Subsequent to determining AODAT and AST, the process 400 calculates a slope 'M' based upon two or more iterations of AODAT, AST, and the Total_heat_transferred calculations at step 440.

The slope 'M' is the slope of the graph relating Total_heat_transferred to (AODAT−AST), and may be calculated by:

$$M = ((AODAT_2 - AST_2) - (AODAT_1 - AST_1))/(Total\_heat\_transferred_2 - Total\_heat\_transferred_1)$$

where
$AST_1$ represents an average space temperature for the 1st period,
$AST_2$ represents an average space temperature for the 2nd period,
$AODAT_1$ represents an average outdoor air temperature for the 1st period,
$AODAT_2$ represents an average outdoor air temperature for the 2nd period, and
Total_heat_transferred$_1$ and Total_heat_transferred$_2$ being defined hereinabove and having been calculated in step 424.

At step 442 of the process 400, the system 10 may apply various statistical conditioning or averaging of the slope M to maintain consistency. Because the slope of the graph relates Total_heat_transferred to (AODAT−AST) it should remain fairly constant, since the slope is directly related to the R-value of the structure's envelope (as well as other minor factors-in some cases). In one embodiment, a time period of one week may be used to maintain consistency/accuracy by averaging M over that time period. M could be averaged by:

$$AM \cong (\Sum_{i=1}^{z} x_i)/z$$

where
AM represents an average of M over time,
x represents M, as defined above,
z represents a number of preset periods during the time span in which M is averaged (the time span in which M is averaged could be one week, two weeks, etc.), and i represents a predetermined interval where each M is calculated.

Under this summation equation, the difference between the beginning of the time span and the end of the time span may be defined as a week (i.e., 7 days), while M, could be recalculated every six hours, or once a day, for example. As noted above, if slope M is to be calculated every six hours, then the subsequent periods within the calculations for AODAT, AST, and Total_heat_transferred would preferentially use six-hour time periods, where appropriate. AM may be calculated using the following equation:

$$AM = (\int_a^b f(x)dx)/(b-a)$$

where
Where f(x) represents a function of m slope calculations over the time span a to b,
a represents a beginning of the time span, and
b represents an end of the time span.

Figure 9:
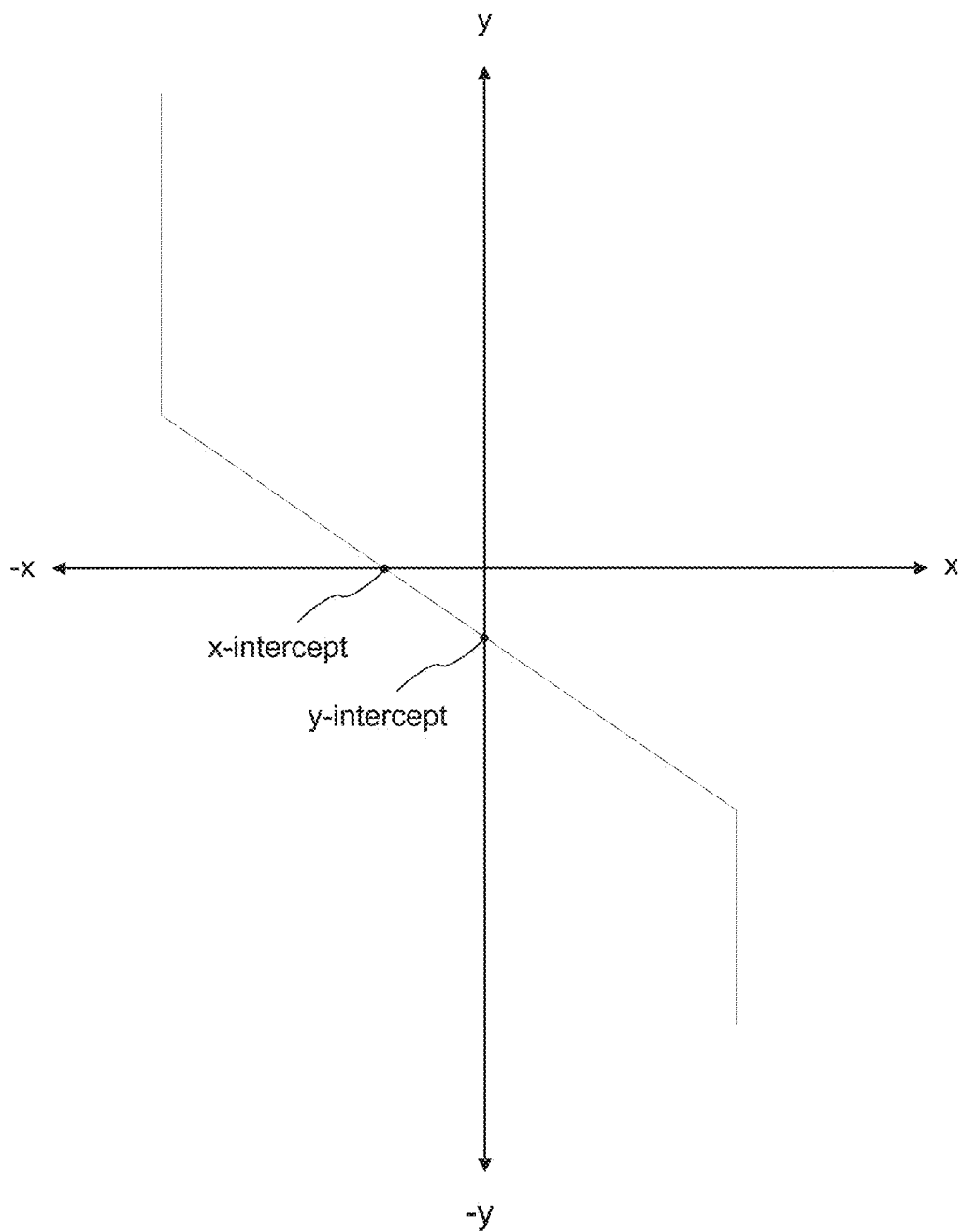
FIG. 9 graphically illustrates a heat transfer metric with respect to temperature, in accordance with the present disclosure.

With reference to FIG. 9, B is a y-intercept used on FIG. 9 that illustrates a relationship of Total_heat_transferred to (AODAT−AST). At step 444 of process 400, B may be calculated for a time period, i, by the equation:

$$B = (AODAT_i - AST_i) - (Total\_heat\_transferred_i * M_i)$$

where
AODAT represents average outdoor air temperature, as defined previously,
AST represents average space temperature, as defined previously,
i represents a predetermined interval where each B is calculated, and
M represents a slope of the graph comparing Total_heat_transferred to (AODAT−AST).

Similar to calculating AM, an average B could be calculated over a time span. Average B, represented as AB, may be calculated in step 446 of the process 400 using:

$$AB \cong (\Sigma_{i=1}^z x_i)/z$$

where
AB represents an average of B over time,
x represents B, as defined above,
z represents a number of preset periods during the time span in which B is averaged (the time span in which B is averaged could be one week, two weeks, etc.), and
i represents a predetermined interval where each B is calculated.

In one embodiment, AB could be calculated by one or more variations of:

$$AB = (\int_a^b f(x)dx)/(b-a)$$

where
f(x) represents a function of y-intercept (B) calculations over a time span a to b,
a represents a beginning of the time span, and
b represents an end of the time span.

Subsequent to determining the AM slope and AB (the average y-intercept of FIG. 9), the process continues to step 450 wherein a NTotal_heat_transferred value is determined. In various embodiments, weather predictions may be utilized in conjunction with the AM slope to determine the next period's (e.g., day), anticipated/projected Total_heat_transferred, i.e., NTotal_heat_transferred. In some embodiments, the AM slope permits incorporating set point data into the equation for determining the next day's anticipated/projected Total_heat_transferred. For example: a church may not have need for cooling any day except Sunday. Such as this is the case, it's likely that the parishioners would set the thermostat to a very high temperature set point for all days except for Sunday. Assuming that the space temperature will need to reach the space temperature set point, we can use the slope to determine the NTotal_heat_transferred.

A predicted space temperature may be determined by taking all relevant data regarding scheduled set point information (which correlates space temperature set points with times), default space temperature set points, historical user set point data, etc. Although the usual day/night temperature swing which occurs will lead to many embodiments simply having a daily time period, one skilled in the art may envision an embodiment configured, such that energy may be stored, in a region of the world like Antarctica, wherein the period may be generally extended for the entire warm season, which would be the summer. Such as the normal one-day embodiment will be the case, the calculation of ASTSP, is provided as an exemplary embodiment for an exemplary application, normally being about one day, however it should be understood by those skilled in the art that the one day examples given herein are not intended to limit the scope of the disclosure. ASTSP, generally, may include the average space temperature set points for the next period and may be calculated by:

$$ASTSP \cong (\Sigma_{i=1}^z x_i)/z$$

where
ASTSP represents an average space temperature set point for a period,
z represents a number of preset timed intervals during the period (usually 22 or 24 hours, but could be 6 hours, etc.) wherein each measure of the space temperature set point is taken,
x represents the space temperature set point, and
i represents a predetermined time interval.

Alternatively, the ASTSP could be calculated by:

$$ASTSP = (\int_a^b f(x)dx)/(b-a)$$

where
f(x) is a function of space temperature set points from a to b,
a represents a beginning of the time period,
b represents an end of the time period.

PAODAT is the predicted average outdoor air temperature. In one embodiment, this value may be determined from an average of the predicted outdoor air temperatures (PODAT) over a future time period. In one embodiment, PAODAT may be based upon forecasted predictions from subscription or governmental sources, e.g., weather forecasting information. In one embodiment, PAODAT may simply be based upon a rolling average temperature period over a predefined number of time periods, e.g., days. As there are many ways to determine PAODAT, which one skilled in the art will recognize upon a careful reading of the disclosure herein may understand there are many ways to determine PAODAT.

PAST is the predicted average space temperature for the following time period (i.e. the next day or next 12 hours, etc.). There are many ways to calculate PAST. In one embodiment of the invention, PAST may be equal to the AST of a chosen historical time period, such as the day before, or the same day of the previous week. The limitation of setting PAST equal to a previous time period's AST is that this method does not take into account the future set point temperature schedule.

In one embodiment, PAST is a function of predicted outdoor air temperature (PODAT) and the future set point temperature. Using historical data, the space temperature could be plotted versus the outdoor air temperature under different set point temperature conditions. From this data, functions to represent ST versus ODAT, under different set point conditions, could be determined. Any data that derives a non-functional result would be negated or accounted for differently. Next, the PODAT could be substituted for the ODAT in the functions. In one embodiment, PAST can be calculated as follows:

$$PAST = \left(\frac{1}{T1+T2+\ldots+Tn}\right)\left(T1*\frac{\int_{a1}^{b1}(f(x))1\,dx}{b1-a1} + T2*\frac{\int_{a1}^{b1}(f(x))2\,dx}{b2-a2} + \ldots + Tn*\frac{\int_{an}^{bn}(f(x))n\,dx}{bn-an}\right)$$

where
x represents a predicted outdoor air temperature (POADT),
$(f(x))1, (f(x))2 \ldots (f(x))n$ represent a function of space temperature based on POADT, wherein the function may be different for every set point temperature,
T1, T2 . . . Tn represent time intervals in which the set point temperature remains a constant (i.e. for the first 4 hours (T1=4) of the day the set point is at 70° F., for the next 6 hours (T2=6) the set point is 72° F., etc.),
n represents a total number of set point intervals for the time period (i.e. day, 12 hours, etc.),
b1, b2, bn represent an ending POADT of the interval, and
a1, a2, an represent a beginning POADT of the interval.

In one embodiment, PAST may be calculated based upon Newton's
"Law of Cooling (Warming)." Newton's "Law of Cooling" states that the rate at which the temperature changes of one body is proportional to the difference in the temperatures of the body and the environment. In this application, the environment includes the outside as well as the effects of internal heat sources, such as computers, lights, etc. The differential equation for Newton's "Law of Cooling" is as follows:

$$\frac{d(ST)}{dt} = k(ODAT1 - ST)$$

Accounting for internal heat sources:

$$\frac{d(ST)}{dt} = k(YODAT1 - ST)$$

where $$\frac{d(ST)}{dt}$$

represents a rate of change of temperature with respect to time,
k represents a proportionality constant,
t represents time,
YODAT1 represents the outdoor air temperature minus the value of the above B or AB at the start of the time interval, and
ST represents a space temperature at any time t.

We will begin by assuming that the building is warming up and YODAT1>ST1. This differential equation is solved by separating the variables:

$$\frac{d(ST)}{(YODAT1 - ST)} = k\,dt$$

and then integrating $$\int \frac{d(ST)}{(YODAT1 - ST)} = \int k\,dt$$

$$\ln|YODAT1 - ST| = kt + c$$

where
c represents a constant obtained in any antiderivative.
Solve for ST via exponentials on both sides of the equation:

$$YODAT1 - ST = e^{kt+c}$$

$$YODAT1 - ST = (e^{kt})(e^c)$$

Since c is a constant, $e^c$ is also a constant, hereinafter referred to as: C and the equation becomes:

$$YODAT1 - ST = Ce^{kt}.$$

By solving for ST, the equation may be represented as:

$$ST = YODAT1 - Ce^{kt}.$$

In predicting how the structure responds to temperature changes, both k and C can be determined. Two data points are used to determine how the structure naturally warms. Using historical data (t1, ST1) and (t2, ST2) where the numbers 1 and 2 indicate first and second data points while YODAT1 remains constant.

These data points are inserted into the solved differential equation to obtain two equations with the same two unknowns, k and C.

$$ST1 = YODAT1 - Ce^{k(t1)}$$

$$ST2 = YODAT1 - Ce^{k(t2)}$$

To simply solve for k and C, we can assume that t1=0.

$$ST1 = YODAT1 - Ce^{k(0)}$$

$$ST1 = YODAT1 - C$$

$$C = YODAT1 - ST1$$

and C is simply the difference in the initial indoor and outdoor temperatures minus the value of B or AB.
Substituting this value of C into the same equation with the second data point, we can solve for k.

$$ST2 = YODAT1 - (YODAT1 - ST1)e^{k(t2)}$$

$$\frac{ST2 - YODAT1}{-(YODAT1 - ST1)} = e^{k(t2)}$$

$$\ln\left(\frac{ST2 - YODAT1}{-(YODAT1 - ST1)}\right) = k(t2)$$

$$k = \frac{\ln\left(\frac{ST2 - YODAT1}{-(YODAT1 - ST1)}\right)}{(t2)}$$

If t1≠0, then we can transform the equations removing the exponentials to solve for k and C. First, substitute the two data points to obtain two equations.

$$YODAT1-ST1=Ce^{k(t1)}$$

$$YODAT1-ST2=Ce^{k(t2)}$$

We now take the natural logarithm of both sides.

$$\ln(YODAT1-ST1)=\ln(Ce^{k(t1)})$$

$$\ln(YODAT1-ST1)=\ln(C)+\ln(e^{k(t1)})$$

$$\ln(YODAT1-ST1)=\ln(C)+k(t1)$$

We use the same process with the second equation to obtain:

$$\ln(YODAT1-ST2)=\ln(C)+k(t2).$$

Using the method of elimination, we first solve for k. One equation is subtracted from the other and the common term $\ln(C)$ is eliminated yielding:

$$\ln(YODAT1-ST2)-\ln(YODAT1-ST1)=k(t2)-k(t1)$$

$$\ln(YODAT1-ST2)-\ln(YODAT1-ST1)=k(t2-t1)$$

$$k = \frac{\ln(YODAT1-ST2)-\ln(YODAT1-ST1)}{(t2-t1)}$$

$$k = \frac{\ln\left(\frac{YODAT1-ST2}{YODAT1-ST1}\right)}{(t2-t1)}$$

Knowing the value of k, we can substitute this value and solve for C:

$$\ln(YODAT1-ST1) = \ln(C) + kt_1$$

$$\ln(YODAT1-ST1) = \ln(C) + \frac{\ln(YODAT1-ST2)-\ln(YODAT1-ST1)}{(t2-t1)}(t1)$$

$$\ln(C) = \ln(YODAT1-ST1) - \frac{\ln(YODAT1-ST2)-\ln(YODAT1-ST1)}{(t2-t1)}(t1)$$

$$C = e^{\left[\ln(YODAT1-ST1) - \frac{\ln(YODAT1-ST2)-\ln(YODAT1-ST1)}{(t2-t1)}(t1)\right]}$$

$$C = e^{\left[\ln(YODAT1-ST1) - \frac{\ln\left(\frac{YODAT1-ST2}{YODAT1-ST1}\right)}{(t2-t1)}(t1)\right]}$$

The value of k is a value dependent on the thermal characteristics of the structure. The value C would be calculated with different values of YODAT1 and ST1.

When the outside temperature minus the above B or AB is less than the inside temperature (YODAT2<ST1, where YODAT2 is the outdoor air temperature minus either B or AB, the structure will naturally cool. Again, we start with Newton's "Law of Cooling":

$$\frac{d(ST)}{dt} = k(ST - YODAT2).$$

where
YODAT2 represents the outdoor air temperature minus the value of above B or AB at the start of the time interval.

Separate the variables and integrate as before:

$$\int \frac{d(ST)}{ST - YODAT2} = \int k\,dt$$

$$\ln|ST - YODAT2| = kt + c$$

$$ST - YODAT2 = e^{kt+c}$$

$$ST - YODAT2 = Ce^{kt}$$

$$ST = Ce^{kt} + YODAT2$$

Two data points are used to determine how the structure naturally cools. Using historical data (t1, ST1) and (t2, ST2) where the numbers 1 and 2 are the labels for the first and second data points while YODAT2 remains constant. These data points are inserted into the above solved differential equation to obtain two equations with the same two unknowns, k and C.

$$ST1=Ce^{k(t1)}+YODAT2$$

$$ST2=Ce^{k(t2)}+YODAT2$$

To simply solve for k and C, we can assume that t1=0.

$$ST1=Ce^{k(0)}+YODAT2$$

$$ST1=C+YODAT2$$

$$C=ST1-YODAT2$$

Where C is the difference in the initial indoor and outdoor temperatures minus the y-intercept (B or AB—as defined herein above) of FIG. 9 for the start of the period of structural cooling.

Substituting this value of C into the same equation with the second data point, we can solve for k.

$$ST2 = (ST1 - YODAT2)e^{k(t2)} + YODAT2$$

$$\frac{ST2 - YODAT2}{ST1 - YODAT2} = e^{k(t2)}$$

$$\ln\left(\frac{ST2 - YODAT2}{ST1 - YODAT2}\right) = k(t2)$$

$$k = \frac{\ln\left(\frac{ST2 - YODAT2}{ST1 - YODAT2}\right)}{(t2)}$$

If t1≠0, then we can transform the equations removing the exponentials to solve for k and C as before.

$$ST1-YODAT2=Ce^{k(t1)}$$

$$ST2-YODAT2=Ce^{k(t2)}$$

We may now take the natural logarithm of both sides.

$$\ln(ST1-YODAT2)=\ln(Ce^{k(t1)})$$

$$\ln(ST1-YODAT2)=\ln(C)+\ln(e^{k(t1)})$$

$$\ln(ST1-YODAT2)=\ln(C)+k(t1)$$

We use the same process with the second equation to obtain $$\ln(ST2-YODAT2)=\ln(C)+k(t2).$$

Using the method of elimination, we first solve for k. One equation is subtracted from the other and the common term $\ln(C)$ is eliminated yielding $$\ln(ST2 - YODAT2) - \ln(ST1 - YODAT2) = k(t2) - k(t1)$$

$$\ln(ST2 - YODAT2) - \ln(ST1 - YODAT2) = k(t2 - t1)$$

$$k = \frac{\ln(ST2 - YODAT2) - \ln(ST1 - YODAT2)}{(t2 - t1)}$$

$$k = \frac{\ln\left(\frac{ST2 - YODAT2}{ST1 - YODAT2}\right)}{(t2 - t1)}$$

Knowing the value of k, we can substitute this value and solve for C.

$$\ln(ST1 - YODAT2) = \ln(C) + kt_1$$

$$\ln(ST1 - YODAT2) =$$

$$\ln(C) + \frac{\ln(ST2 - YODAT2) - \ln(ST1 - YODAT2)}{(t2 - t1)}(t1)$$

$$\ln(C) = \ln(ST1 - YODAT2) -$$

$$\frac{\ln(ST2 - YODAT2) - \ln(ST2 - YODAT2)}{(t2 - t1)}(t1)$$

$$C = e^{\left[\ln(ST1-YODAT2) - \frac{\ln(ST2-YODAT2)-\ln(ST1-YODAT2)}{(t2-t1)}(t1)\right]}$$

$$C = e^{\left[\ln(ST1-YODAT2) - \frac{\ln\left(\frac{ST2-YODAT2}{ST1-YODAT2}\right)}{(t2-t1)}(t1)\right]}$$

We will use as an example three intervals to see how PAST can be calculated: naturally warming, maintaining set point (STSP), and naturally cooling. Space temperature (ST) is a function of time (t).

$$ST(t) = \begin{cases} YODAT1 - Ce^{kt} & t1 \le t < t2 \\ STSP & t2 \le t < t3 \\ Ce^{kt} + YODAT2 & t3 \le t \le t4 \end{cases}$$

where
STSP represents space temperature set point.

Figure 10A:
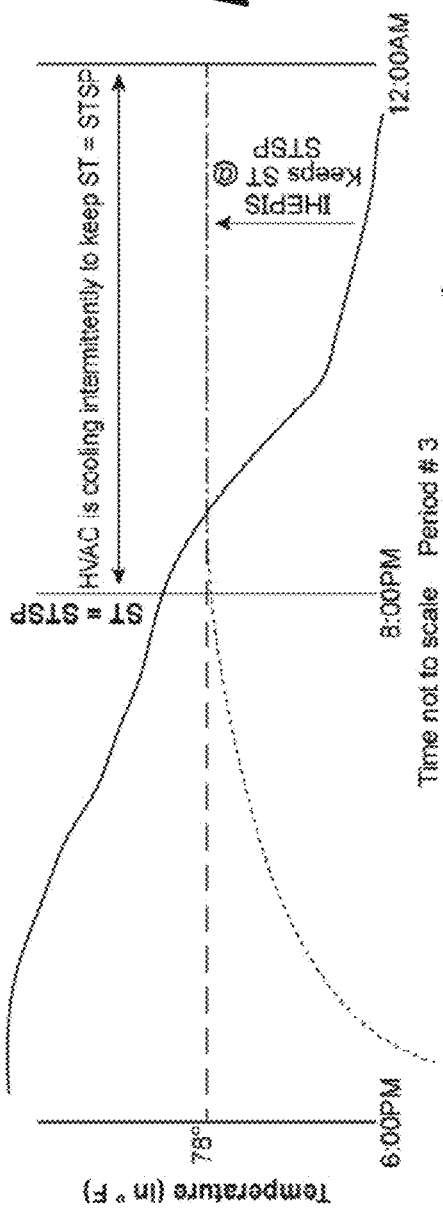
FIGS. 10A and 10B graphically illustrates exemplary operating metrics of the temperature control system, in accordance with the present disclosure.
Figure 10B:
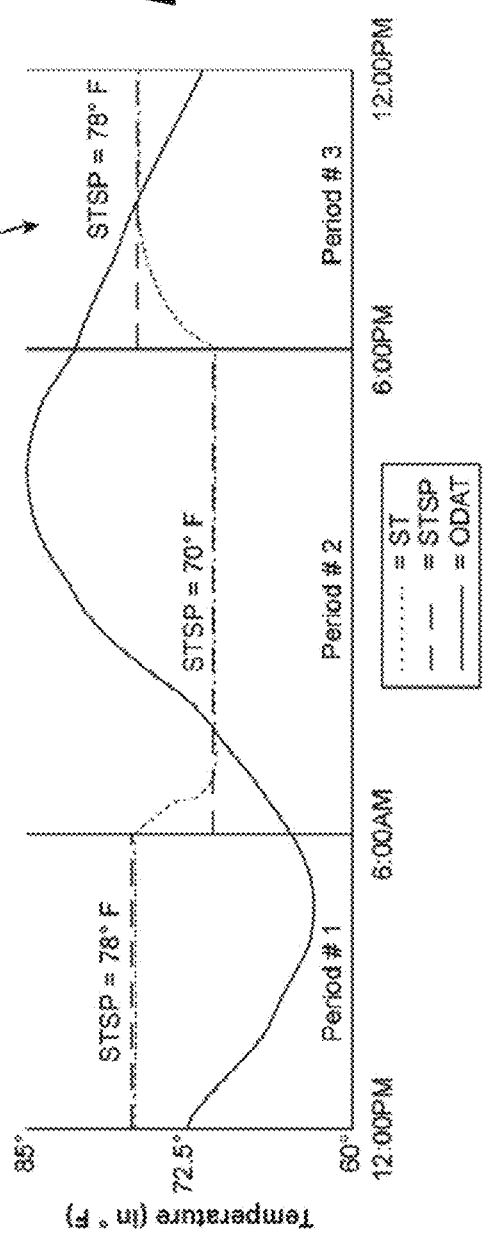

Knowing the value of k for warming and cooling, we can predict PAST. In one instance as FIGS. 10A and 10B illustrate, there may be a period of natural warming, a steady period (temperature at STSP), and a period of natural cooling. Finding the average (PAST) may be done the following way:

$$PAST = \frac{1}{t4 - t1} \int_{t1}^{t4} ST(t) dt$$

$$= \frac{1}{t4 - t1} \left[ \int_{t1}^{t2} (YODAT1 - Ce^{kt}) dt + \int_{t2}^{t3} (STSP) dt + \int_{t3}^{t4} (Ce^{kt} + YODAT2) dt \right]$$

Using the value of k from the historical data and the difference in indoor and outdoor temperatures (plus the value of B or AB), we can predict when the ST of the structure will be at STSP as the building warms using: STSP=YODAT1−$Ce^{kt}$. Solve for t. This is t2. This defines an interval of natural structural warming [t1, t2].

While the structure is at STSP and the cooling system cycles, this will define the next interval [t2, t3] as the value of t3 can be obtained from predicted weather (the time at which YODAT2=STSP) after the heat of the day (YODAT2 being the outdoor air temperature minus the value of above B or AB).) The interval of time through which the structure naturally cools will define the third interval [t3, t4]. t4 would be the time at which the outdoor ambient conditions are desirable to condition the structure. Again, t4 can be obtained from predicted hourly weather (hourly, minutely, etc.) and may be set, in one embodiment, to a time at which it is desirable to condition the space. In another embodiment, t4 may be a time at which YODAT=STSP, etc.

The expansion of each interval in the calculation of PAST is shown below.

$$\int_{t1}^{t2} (YODAT1 - Ce^{kt}) dt = \int_{t1}^{t2} (YODAT1) dt - \int_{t1}^{t2} (Ce^{kt}) dt$$

$$= (YODAT1)t\Big|_{t1}^{t2} - \frac{C}{k}(e^{kt})\Big|_{t1}^{t2}$$

$$= (YODAT1)(t2 - t1) - \frac{C}{k}(e^{k(t2)} - e^{k(t1)})$$

$$\int_{t2}^{t3} (STSP) dt = (STSP)t\Big|_{t2}^{t3}$$

$$= (STSP)(t3) - (STSP)(t2)$$

$$= STSP(t3 - t2)$$

$$\int_{t3}^{t4} (Ce^{kt} + YODAT2) dt = \int_{t3}^{t4} (Ce^{kt}) dt + \int_{t3}^{t4} (YODAT2) dt$$

$$= \frac{C}{k}(e^{kt})\Big|_{t3}^{t4} + (YODAT2)t\Big|_{t3}^{t4}$$

$$= \frac{C}{k}(e^{k(t4)} - e^{k(t3)}) + (YODAT2)(t4 - t3)$$

When considering the teachings herein above, one skilled in the art could determine PAST using the conditional processes described herein above for various scenarios.

The predicted average space temperature (PAST) for the next period, e.g. the next day, could be extracted from a user-supplied temperature schedule, default temperature schedule, historical user entry data, a combination of these, the equations given herein above, etc. The NTotal_heat_transferred value is that which the system 10 would try to achieve in order to condition the structure in preparation of the next day, however, upper and lower limits may inhibit the value being too high or low, and/or upper and lower limits may inhibit the operations to achieve NTotal_heat_transferred in order to keep the space temperature within reasonable limits. The appropriate limits on the operations of the systems may be understood by one skilled in the art, when considering the teachings herein disclosed.

In one embodiment, NTotal_heat_transferred may be calculated by:

NTotal_heat_transferred=((PAODAT−PAST)−AB)/AM where
AM represents an average M, as previously defined,
AB represents an average B, as previously defined,
PAODAT represents a predicted average outdoor air temperature, and
PAST represents a predicted average space temperature over a period.

If volumetric flow rates of the system 10 are known in real units of measure (i.e. CFM,) then industry standard calculations could be made to determine the real value, in terms of real units of measure (i.e. BTU), of heat transfer. Also an amount of energy produced inside the structure due to people, computers, lights, etc., which is referred to as IHEPIS (the value of the x-intercept of the graph in FIG. 9 multiplied by −1) could be calculated using real units of measure (e.g., BTU's). Also, if the surface area of the structure's envelope is known, then the R-value of the structure's envelope could be computed using the slope of (AODAT−AST)/Total_heat_transferred, although if for instance a window was left open, the resulting heat transfer would affect the calculated R-value.

Additionally, k could be used to calculate the effective thermal capacity of the structure.

Subsequent to determining NTotal_heat_transferred, the system 10 may operate various components to effect ventilation, cooling, and/or heating at step 460 based upon the calculated NTotal_heat_transferred value. In a simplified example, the following table shows the AODAT, AST, and total_heat_transferred over three days (i.e. three time periods). Please note that this example may not be typical, but rather is given for illustrative purposes.

| Day | Monday | Tuesday | Wednesday |
|---|---|---|---|
| AODAT | 70° F. | 90° F. | 50° F. |
| AST | 68° F. | 68° F. | 68° F. |
| Total_heat_transferred | −100° F.-min | −600° F.-min | 200° F.-min |

In this example, M1 is the slope for the graph comparing Total_heat_transferred to (AODAT-AST) from Monday to Tuesday, and M2 is the slope from Tuesday to Wednesday. M1 and M2 may be calculated as:

$$M1=((70-68)-(90-68))/((-100)-(-600))=-1/25$$

$$M2=((90-68)-(50-68))/((-600)-200)=-1/20$$

Therefore, the average slope, AM=((−1/25)+(−1/20))/2=−0.045. Next, the y-intercept (B1) from Monday to Tuesday, and B2 from Tuesday to Wednesday would be calculated as follows:

$$B1=(70-68)-(-100)*(-1/25)=-2° F.$$

$$B2=(50-68)-(200)*(-1/20)=-8° F.$$

Therefore, the average B, AB=((−2)+(−8))/2=−5° F. If PAODAT for Thursday was calculated as 75° F., and PAST for Thursday was calculated as 68° F., NTotal_heat_transferred could be calculated for this example as:

$$N\text{Total\_heat\_transferred}=((75-68)-(-5))/(-0.045)=-267° F.-min.$$

This means that the system would cool the structure on Thursday, transferring −267° F.-min of heat energy to do so. Therefore, during the time when conditions were optimal (usually from 4-6 am), the system would bring in cool outdoor air for a certain amount of time until the total_heat_transferred reached the −267° F.-min necessary to meet the day's predicted cooling requirements. Alternatively, the system could also activate mechanical cooling (i.e. compressors, refrigeration systems, etc.) to cool the structure. If NTotal_heat_transferred were a positive value, then the system could heat the structure instead of cooling it. If opportune, this could be done during the heat of the day by bringing in outdoor air and exhausting indoor air, or alternatively, with mechanical heating (i.e. heat pumps, etc.) if conditions warranted such action.

The internal heat energy produced inside a structure, due to things like lighting, computers, etc. is referred to herein as: "IHEPIS".

In order to model IHEPIS, at least two periods with varying Total_heat_transferred and (AODAT−AST) values may be used in order to determine a slope M, which has a correlation to the R-value of that structure's envelope. IHEPIS may be calculated as the value of −1 multiplied by the x-intercept of the graph, shown as exemplary FIG. 9 comparing Total_heat_transferred to (AODAT−AST). Once the average slope (AM) and average y-intercept (AB) are known over a time span, IHEPIS could be calculated as:

$$IHEPIS=-1*(-AB/AM)$$

where
AB=average y-intercept B, as defined previously, and
AM=average slope M, as defined previously.

As one skilled in the art will readily understand upon a careful reading of the teachings herein, space temperature set point may be used rather than space temperature to operate many of the functions, calculations, and equations disclosed herein.

The disclosure has described certain preferred embodiments and modifications thereto. Further modifications and alterations may occur to others upon reading and understanding the specification. Therefore, it is intended that the disclosure not be limited to the particular embodiment(s) disclosed for carrying out this disclosure, but that the disclosure will include all embodiments falling within the scope of the appended claims.

The invention claimed is:

1. A method for operating a temperature control system having a ventilation subsystem and a cooling subsystem, the method comprising:
   monitoring an indoor temperature of a structure;
   monitoring an outdoor temperature of ambient air outside of the structure;
   defining a first time range and a second time range, wherein the second time range comprises a duration less than the first time range;
   associating one or more operating parameters of the ventilation subsystem and the cooling subsystem with the first time range;
   associating one or more operating parameters of the ventilation subsystem and the cooling subsystem with the second time range;
   monitoring operational time and operational load of the cooling subsystem for the first time range;
   predicting a space temperature and an outdoor air temperature for a subsequent time period; and
   controlling the ventilation subsystem during the second time range based upon the monitored operational time and operational load of the cooling subsystem for the first time range, the monitored interior and exterior temperatures, the predicted space temperature, the predicted outdoor air temperature, and the one or more operating parameters of the cooling subsystem associated with the second time range.

2. The method of claim 1, wherein the predicting the space temperature is predicted based upon the monitored indoor and outdoor temperature of one or more prior defined time periods, and a user-supplied temperature set point(s) associated with the one or more prior defined time periods.

3. The method of claim 1, wherein the predicting the space temperature is predicted based upon the monitored indoor and outdoor temperature of one or more prior defined time periods, a user-supplied temperature set point(s) associated with the one or more prior defined time periods, and the predicted outdoor air temperature.

4. The method of claim 3, wherein the predicting a space temperature is calculated using:

$$\left(\frac{1}{T1+T2+\ldots+Tn}\right)$$

$$\left(T1*\frac{\int_{a1}^{b1}(f(x))1dx}{b1-a1}+T2*\frac{\int_{a1}^{b1}(f(x))2dx}{b2-a2}+\ldots+Tn*\frac{\int_{an}^{bn}(f(x))ndx}{bn-an}\right)$$

where
x represents the predicted outdoor air temperature (POADT),
(f(x))1, (f(x))2 . . . (f(x))n represent a function of space temperature,
T1, T2 . . . Tn represent time intervals,
n represents a total number of set point intervals for the time period,
b1, b2, bn represent an ending POADT of the interval, and
a1, a2, an represent a beginning POADT of the interval.

5. The method of claim 1, further comprising:
monitoring a supply air temperature and a return air temperature;
monitoring an operating status of a ventilation system;
monitoring space temperature;
calculating a first average space temperature for a first time period based upon the monitored inside air temperature;
calculating a second average space temperature for a second time period based upon the monitored inside air temperature;
calculating a first average outdoor air temperature for the first time period based upon the monitored outdoor air temperature;
calculating a second average outdoor air temperature for the second time period based upon the monitored outdoor air temperature; and
further controlling the temperature control system based upon the supply air temperature, the return air temperature, the monitored space temperature; the operating status of the ventilation system, the calculated first average space temperature, the calculated second average space temperature, the calculated first average outdoor air temperature, and the calculated second average outdoor air temperature.

6. The method of claim 5, wherein the temperature control system further includes an outdoor air damper; and wherein the method further includes:
monitoring a mixed air temperature, wherein the mixed air temperature is monitored within a housing of the temperature control, downstream of a return air supply and downstream of outside air;
calculating an opening position of the outdoor air damper based upon the monitored return air temperature, the monitored mixed air temperature, and the monitored outdoor temperature; and
further controlling the temperature control system based upon the monitored opening position.

7. The method of claim 6, wherein controlling the temperature control system further includes:
iteratively, at defined time periods, summing, for a first result, a product of the monitored operating status of the ventilation system with a difference of the supply air temperature and the monitored return air temperature and a difference of a product of the monitored operating status of the ventilation system and the calculated opening position of the outdoor air damper with a difference of the monitored outdoor temperature and the monitored return air temperature;
further controlling the temperature control system based upon the iteratively summing;
iteratively, at defined time periods, summing, for a second result, a product of the monitored operating status of the ventilation system and the monitored opening position of the outdoor air damper with the difference of the monitored outdoor temperature and the monitored return air temperature; and
further controlling the temperature control system based upon the iteratively summing.

8. The method of claim 7, wherein controlling the temperature control system further includes:
further controlling the temperature control system based upon a sum of the first result and the second result; and
averaging a difference between the first average outdoor air temperature and the first average space temperature subtracted from a product of the sum of the first result and the second result and a variable M calculated by: a difference between the difference of the second average outdoor air temperature for the second time period and the second average space temperature for the second time period and the difference between the first average outdoor air temperature for the first time period and the first average space temperature for the first time period divided by: a difference between the sum of the first result and the second result calculated at the second time period and the sum of the first result and the second result calculated at the first time period.

9. The method of claim 1, further comprising:
monitoring a mixed air temperature, wherein the mixed air temperature is monitored within a housing of the temperature control, downstream of a return air supply and downstream of outside air;
calculating an opening position of an outdoor air damper based upon the monitored return air temperature, the monitored mixed air temperature, and the monitored outdoor temperature;
further controlling the temperature control system based upon the calculated damper position.

10. The method of claim 1, further comprising:
estimating heat energy produced inside the structure based upon the monitored outdoor air temperatures, the monitored indoor air temperatures, and operating status of the temperature control system; and
further controlling the temperature control system based upon the estimated heat energy produced.

11. A method for operating a temperature control system for a structure, the method comprising:
monitoring indoor and outdoor temperature;
monitoring an operating state of the temperature control system;
predicting a space temperature and an outdoor air temperature for a subsequent time period;
estimating an operating metric for temperature control system based upon the (a) monitored interior temperature of the structure, (b) monitored outside air temperature, (c) monitored operating state of the temperature control system, (d) predicted space temperature, and (e) predicted outdoor air temperature; and
controlling the temperature control system during the subsequent time period based upon the estimated operating metric.

12. The method of claim 11, wherein the operating state of the temperature control system is one of an ON operating state or an OFF operating state for each of a heating system, a cooling system, and a ventilation system.

13. The method of claim 11, wherein the predicting the space temperature is predicted based upon the monitored indoor temperature of a prior defined time period and user-supplied temperature set point(s).

14. The method of claim 11, wherein the predicting the space temperature is an average temperature of a prior defined time period.

15. The method of claim 11, wherein the predicting a space temperature is predicted based upon the predicted outdoor air temperature, the monitored outdoor air temperature, and user-supplied temperature set points.

16. The method of claim 11, wherein the predicting the space temperature is predicted based upon the monitored indoor and outdoor temperature of one or more prior defined time periods, a user-supplied temperature set point(s) associated with the one or more prior defined time periods, and the predicted outdoor air temperature.

17. The method of claim 11, wherein the predicting a space temperature is calculated using:

$$\left(\frac{1}{T1+T2+\ldots+Tn}\right)$$

$$\left(T1*\frac{\int_{a1}^{b1}(f(x))1dx}{b1-a1}+T2*\frac{\int_{a1}^{b1}(f(x))2dx}{b2-a2}+\ldots+Tn*\frac{\int_{an}^{bn}(f(x))ndx}{bn-an}\right)$$

where
x represents the predicted outdoor air temperature (POADT),
(f(x))1, (f(x))2 ... (f(x))n represent a function of space temperature,
T1, T2 ... Tn represent time intervals,
n represents a total number of set point intervals for the time period,
b1, b2, bn represent an ending POADT of the interval, and
a1, a2, an represent a beginning POADT of the interval.

18. The method of claim 11, wherein the predicting a space temperature is calculated using:

$$PAST = \frac{1}{t4-t1}\int_{t1}^{t4}ST(t)dt$$

$$= \frac{1}{t4-t1}\left[\begin{array}{l}\int_{t1}^{t2}(YODAT1-Ce^{kt})dt+\\ \int_{t2}^{t3}(STSP)dt+\int_{t3}^{t4}(Ce^{kt}+YODAT2)dt\end{array}\right]$$

where
PAST represents the predicting a space temperature, $$\frac{d(ST)}{dt}$$

represents a rate of change of temperature with respect to time,
STSP represents space temperature set point,
ST represents a space temperature at any time t, wherein ST=STSP when STSP=YODAT1−C e^(kt)
k represents a proportionality constant,
t represents time, YODAT1 represents the outdoor air temperature plus the value of B at the start of the time interval,
YODAT2 represents the outdoor air temperature plus the value of B at the start of the second time interval, and
C is constant and where $$B=(AODAT_i-AST_i)-(Total\_heat\_transferred_i*M_i)$$

where
AODAT represents average outdoor air temperature, as defined previously,
AST represents average space temperature, as defined previously,
i represents a predetermined interval where each B is calculated, and
M represents a slope of the graph comparing Total_heat_transferred to (AODAT−AST).

19. The method of claim 11, wherein the predicting the outdoor air temperature is executed based upon received weather forecasting information.

20. The method of claim 11, wherein the predicting the outdoor air temperature is determined based upon a rolling average of the monitored outdoor air temperature.

21. The method of claim 11, further comprising:
monitoring a supply air temperature and a return air temperature;
monitoring an operating status of a ventilation system;
monitoring space temperature;
calculating a first average space temperature for a first time period based upon the monitored inside air temperature;
calculating a second average space temperature for a second time period based upon the monitored inside air temperature;
calculating a first average outdoor air temperature for the first time period based upon the monitored outdoor air temperature;
calculating a second average outdoor air temperature for the second time period based upon the monitored outdoor air temperature; and
further controlling the temperature control system based upon the supply air temperature, the return air temperature, the monitored space temperature; the operating status of the ventilation system, the calculated first average space temperature, the calculated second average space temperature, the calculated first average outdoor air temperature, and the calculated second average outdoor air temperature.

22. The method of claim 21, wherein the temperature control system further includes an outdoor air damper; and wherein the method further includes:
monitoring a mixed air temperature, wherein the mixed air temperature is monitored within a housing of the temperature control, downstream of a return air supply and downstream of outside air;
calculating an opening position of the outdoor air damper based upon the monitored return air temperature, the monitored mixed air temperature, and the monitored outdoor temperature; and
further controlling the temperature control system based upon the monitored opening position.

23. The method of claim 22, wherein controlling the temperature control system further includes:
iteratively, at defined time periods, summing, for a first result, a product of the monitored operating status of the ventilation system with a difference of the supply air temperature and the monitored return air temperature and a difference of a product of the monitored operating status of the ventilation system and the calculated opening position of the outdoor air damper with a difference of the monitored outdoor temperature and the monitored return air temperature; and further controlling the temperature control system based upon the iteratively summing.

24. The method of claim 23, wherein controlling the temperature control system further includes:

iteratively, at defined time periods, summing, for a second result, a product of the monitored operating status of the ventilation system and the monitored opening position of the outdoor air damper with the difference of the monitored outdoor temperature and the monitored return air temperature; and further controlling the temperature control system based upon the iteratively summing.

25. The method of claim 24, wherein controlling the temperature control system further includes:

further controlling the temperature control system based upon a sum of the first result and the second result.

26. The method of claim 23, wherein controlling the temperature control system further includes:

averaging a difference between the first average outdoor air temperature and the first average space temperature subtracted from a product of the sum of the first result and the second result and a variable M calculated by: a difference between the difference of the second average outdoor air temperature for the second time period and the second average space temperature for the second time period and the difference between the first average outdoor air temperature for the first time period and the first average space temperature for the first time period divided by: a difference between the sum of the first result and the second result calculated at the second time period and the sum of the first result and the second result calculated at the first time period.

27. The method of claim 11, further comprising:

monitoring a mixed air temperature, wherein the mixed air temperature is monitored within a housing of the temperature control, downstream of a return air supply and downstream of outside air;

calculating an opening position of an outdoor air damper based upon the monitored return air temperature, the monitored mixed air temperature, and the monitored outdoor temperature;

further controlling the temperature control system based upon the calculated damper position.

28. The method of claim 11, further comprising:

estimating heat energy produced inside the structure based upon the monitored outdoor air temperatures, the monitored indoor air temperatures, and operating status of the temperature control system; and further controlling the temperature control system based upon the estimated heat energy produced.

29. The method of claim 11, wherein the temperature control system includes one of a cooling subsystem, a ventilation subsystem, and a heating subsystem.

30. A method for operating a temperature control system having a plurality of temperature control zones within a structure, the method comprising:

monitoring outdoor temperature;

monitoring an operating state of the temperature control system;

monitoring a supply air temperature and a return air temperature;

monitoring an operating status of a ventilation system;

monitoring space temperature;

monitoring a mixed air temperature, wherein the mixed air temperature is monitored within a housing of the temperature control system, downstream of a return air supply and downstream of outside air;

calculating an opening position of the outdoor air damper based upon the monitored return air temperature, the monitored mixed air temperature, and the monitored outdoor temperature;

calculating a first average space temperature for a first time period based upon the monitored inside air temperature;

calculating a second average space temperature for a second time period based upon the monitored inside air temperature;

calculating a first average outdoor air temperature for the first time period based upon the monitored outdoor air temperature;

calculating a second average outdoor air temperature for the second time period based upon the monitored outdoor air temperature;

iteratively, at defined time periods, summing, for a first result, a product of the monitored operating status of the ventilation system with a difference of the supply air temperature and the monitored return air temperature and a difference of a product of the monitored operating status of the ventilation system and the calculated opening position of the outdoor air damper with a difference of the monitored outdoor temperature and the monitored return air temperature;

iteratively, at defined time periods, summing, for a result, a product of the monitored operating status of the ventilation system and the monitored opening position of the outdoor air damper with the difference of the monitored outdoor temperature and the monitored return air temperature;

predicting a space temperature and an outdoor air temperature for a subsequent time period;

estimating an operating metric for temperature control system based upon the (a) monitored interior temperature of the structure, (b) monitored outside air temperature, (c) monitored operating state of the temperature control system, (d) predicted space temperature, and (e) predicted outdoor air temperature, (f) the result, (g) the calculated opening position, (h) the supply air temperature, (i) the return air temperature, (j) the monitored space temperature; (k) the operating status of the ventilation system, (l) the calculated first average space temperature, (m) the calculated second average space temperature, (n) the calculated first average outdoor air temperature, and (o) the calculated second average outdoor air temperature; and controlling the temperature control system during the subsequent time period based upon the estimated operating metric.

31. A method for operating a temperature control system having a ventilation system, the ventilation system comprising an outdoor air damper, the method comprising:

monitoring an outdoor air temperature, return air temperature, and a supply air temperature;

monitoring an operating status of a ventilation system;

monitoring an opening position of the outdoor air damper;

calculating a first metric based upon a product of the monitored operating status of the ventilation system and the monitored opening position of the outdoor air damper with a difference of the monitored outdoor temperature and the monitored return air temperature;

calculating a second metric based upon a product of the monitored operating status of the ventilation system with a difference of the supply air temperature and the monitored return air temperature and a difference of a product of the monitored operating status of the ventilation system and the monitored opening position of the outdoor air damper with the difference of the monitored outdoor temperature and the monitored return air temperature; and controlling the outdoor air damper based upon the calculated first and second metrics.

32. The method of claim 31, wherein the temperature control system further comprises a plurality of temperature sensors and wherein the method further comprises:

calculating an opening position of the outdoor air damper for a subsequent time period based upon input from the plurality of temperature sensors.

33. The method of claim 31, wherein the first and second metrics are iteratively calculated over a time period.

34. The method of claim 31, wherein the first metric is iteratively calculated over a predefined time period, wherein each iteratively calculated first metric is summed together; and wherein the second metric is iteratively calculated over a predefined time period, wherein each iteratively calculated second metric is summed together; and further controlling the outdoor air damper based upon the summed first and second metrics.

35. The method of claim 31, wherein the first metric is iteratively calculated over a predefined time period and integrated over the predefined time period to determine a first resultant value, and wherein the second metric is iteratively calculated over a predefined time period and integrated over the predefined time period to determine a second resultant value; and further controlling the outdoor air damper based upon the first and second resultant values.

36. The method of claim 31, wherein the temperature control system includes an outdoor air damper further, and wherein the method further comprises:

monitoring a mixed air temperature, wherein the mixed air temperature is monitored in a physical space in gaseous communication with a return air supply and outside air;

calculating an opening position of the outdoor air damper based upon the monitored return air temperature, the monitored mixed air temperature, and the monitored outdoor temperature; and wherein the first and second result are determined, in part, based upon the monitored opening position of the outdoor air damper.

37. A thermostat for controlling a temperature control system for a structure, the thermostat comprising:

an indoor temperature sensor configured to monitor indoor air temperature; and a controller configured to execute the following steps:

monitoring indoor temperature;

monitoring an operating state of the temperature control system;

receiving an outdoor air temperature, and a predicted outdoor air temperature for a subsequent time period;

predicting a space temperature for the subsequent time period;

estimating an operating metric for temperature control system based upon the (a) monitored interior temperature of the structure, (b) outside air temperature, (c) monitored operating state of the temperature control system, (d) predicted space temperature, and (e) predicted outdoor air temperature; and controlling the temperature control system during the subsequent time period based upon the estimated operating metric.

38. The thermostat of claim 37, wherein the operating state of the temperature control system is one of an ON operating state or an OFF operating state for each of a heating system, a cooling system, and a ventilation system.

39. The thermostat of claim 37, wherein the predicting the space temperature is predicted based upon the monitored indoor temperature of a prior defined time period and user-supplied temperature set point(s).

40. The thermostat of claim 37, wherein the predicting the space temperature is an average temperature of a prior defined time period.

41. The thermostat of claim 37, wherein the predicting a space temperature is predicted based upon the predicted outdoor air temperature, the monitored outdoor air temperature, and user-supplied temperature set points.

42. The thermostat of claim 37, wherein the predicting the space temperature is predicted based upon the monitored indoor and outdoor temperature of one or more prior defined time periods, a user-supplied temperature set point(s) associated with the one or more prior defined time periods, and the predicted outdoor air temperature.

43. The thermostat of claim 37, wherein the predicting a space temperature is calculated using:

$$\left(\frac{1}{T1+T2+\ldots+Tn}\right)$$

$$\left(T1 * \frac{\int_{a1}^{b1}(f(x))1 dx}{b1-a1} + T2 * \frac{\int_{a1}^{b1}(f(x))2 dx}{b2-a2} + \ldots + Tn * \frac{\int_{an}^{bn}(f(x))n dx}{bn-an}\right)$$

where x represents the predicted outdoor air temperature (POADT), (f(x))1, (f(x))2 . . . (f(x))n represent a function of space temperature, T1, T2 . . . Tn represent time intervals, n represents a total number of set point intervals for the time period, b1, b2, bn represent an ending POADT of the interval, and a1, a2, an represent a beginning POADT of the interval.

44. The thermostat of claim 37, wherein the predicting a space temperature is calculated using:

$$PAST = \frac{1}{t4-t1}\int_{t1}^{t4} ST(t)dt$$

$$= \frac{1}{t4-t1}\left[\begin{array}{c}\int_{t1}^{t2}(YODAT1 - Ce^{kt})dt + \\ \int_{t2}^{t3}(STSP)dt + \int_{t3}^{t4}(Ce^{kt} + YODAT2)dt\end{array}\right]$$

where

PAST represents the predicting a space temperature, $$\frac{d(ST)}{dt}$$

represents a rate of change of temperature with respect to time,

STSP represents space temperature set point,
ST represents a space temperature at any time t, wherein ST=STSP when STSP=YODAT1−C e^(kt)
k represents a proportionality constant,
t represents time,
YODAT1 represents the outdoor air temperature plus the value of B at the start of the time interval,
YODAT2 represents the outdoor air temperature plus the value of B at the start of the second time interval, and
C is constant and where $$B=(AODAT_i-AST_i)-(\text{Total\_heat\_transferred}_i *M_i)$$

where
AODAT represents average outdoor air temperature, as defined previously,
AST represents average space temperature, as defined previously,
i represents a predetermined interval where each B is calculated, and
M represents a slope of the graph comparing Total_heat_transferred to (AODAT−AST).

45. The thermostat of claim 37, wherein the predicting the outdoor air temperature is executed based upon received weather forecasting information.

46. The thermostat of claim 37, wherein the predicting the outdoor air temperature is determined based upon a rolling average of the monitored outdoor air temperature.

47. The thermostat of claim 37, further comprising:
monitoring a supply air temperature and a return air temperature;
monitoring an operating status of a ventilation system;
monitoring space temperature;
calculating a first average space temperature for a first time period based upon the monitored inside air temperature;
calculating a second average space temperature for a second time period based upon the monitored inside air temperature;
calculating a first average outdoor air temperature for the first time period based upon the monitored outdoor air temperature;
calculating a second average outdoor air temperature for the second time period based upon the monitored outdoor air temperature; and
further controlling the temperature control system based upon the supply air temperature, the return air temperature, the monitored space temperature; the operating status of the ventilation system, the calculated first average space temperature, the calculated second average space temperature, the calculated first average outdoor air temperature, and the calculated second average outdoor air temperature.

48. The thermostat of claim 47, wherein the temperature control system further includes an outdoor air damper; and wherein the method further includes:
monitoring a mixed air temperature, wherein the mixed air temperature is monitored within a housing of the temperature control, downstream of a return air supply and downstream of outside air;
calculating an opening position of the outdoor air damper based upon the monitored return air temperature, the monitored mixed air temperature, and the monitored outdoor temperature; and
further controlling the temperature control system based upon the monitored opening position.

49. The thermostat of claim 47, wherein controlling the temperature control system further includes:
iteratively, at defined time periods, summing, for a first result, a product of the monitored operating status of the ventilation system with a difference of the supply air temperature and the monitored return air temperature and a difference of a product of the monitored operating status of the ventilation system and the calculated opening position of the outdoor air damper with a difference of the monitored outdoor temperature and the monitored return air temperature; and
further controlling the temperature control system based upon the iteratively summing.

50. The thermostat of claim 49, wherein controlling the temperature control system further includes:
iteratively, at defined time periods, summing, for a second result, a product of the monitored operating status of the ventilation system and the monitored opening position of the outdoor air damper with the difference of the monitored outdoor temperature and the monitored return air temperature; and
further controlling the temperature control system based upon the iteratively summing.

51. The thermostat of claim 50, wherein controlling the temperature control system further includes:
further controlling the temperature control system based upon a sum of the first result and the second result.

52. The thermostat of claim 49, wherein controlling the temperature control system further includes:
averaging a difference between the first average outdoor air temperature and the first average space temperature subtracted from a product of the sum of the first result and the second result and a variable M calculated by: a difference between the difference of the second average outdoor air temperature for the second time period and the second average space temperature for the second time period and the difference between the first average outdoor air temperature for the first time period and the first average space temperature for the first time period divided by: a difference between the sum of the first result and the second result calculated at the second time period and the sum of the first result and the second result calculated at the first time period.

53. A method for calculating a structure's R-value, the structure having a temperature control system, the method comprising:
monitoring temperature inside the structure and an outdoor air temperature;
monitoring a supply air temperature and a return air temperature;
monitoring an operating status of a ventilation system;
calculating an average space temperature set point for a first time period based upon the monitored inside air temperature;
calculating an average outdoor air temperature for the first time period based upon the monitored outdoor air temperature;
iteratively, at defined time periods, summing, for a first result, a product of the monitored operating status of the ventilation system with a difference of the supply air temperature and the monitored return air temperature and a difference of a product of the monitored operating status of the ventilation system with a difference of the monitored outdoor temperature and the monitored return air temperature;
iteratively, at defined time periods, summing, for a second result, a product of the monitored operating status of the ventilation system with the difference of the monitored outdoor temperature and the monitored return air temperature; and subtracting the average space temperature set point from the average outdoor air temperature and diving by a sum of the first result and the second result to determine a slope value;

correlating the slope value to an R-value; and controlling the temperature control system based upon the correlating.

54. A temperature control system for a structure, the system comprising:

an indoor temperature sensor configured to monitor indoor air temperature;

an outdoor temperature sensor configured to monitor outdoor air temperature;

a server configured to monitor an operating state of the temperature control system, wherein the server is further configured for performing the following steps:

predicting a space temperature and an outdoor air temperature for a subsequent time period;

estimating an operating metric for temperature control system based upon the (a) monitored interior temperature of the structure, (b) monitored outside air temperature, (c) monitored operating state of the temperature control system, (d) predicted space temperature, and (e) predicted outdoor air temperature; and controlling the temperature control system during the subsequent time period based upon the estimated operating metric.

55. The system of claim 54, wherein the temperature control system further comprises a heating system, a cooling system, and a ventilation system, and wherein the operating state of the temperature control system is one of an ON operating state or an OFF operating state for each of the heating system, the cooling system, and the ventilation system.

56. The system of claim 55, wherein the predicting the space temperature is predicted based upon the monitored indoor temperature of a prior defined time period and a user-supplied temperature set point.

57. The system of claim 54, wherein the predicting the space temperature is calculated by one of: (1) an average indoor temperature of a prior defined time period, (2) the predicted outdoor air temperature, the monitored outdoor air temperature, and user-supplied temperature set points, or (3) the monitored indoor and outdoor temperature of one or more prior defined time periods, a user-supplied temperature set point associated with the one or more prior defined time periods, the predicted outdoor air temperature, and the operating state of the temperature control system at each of the one or more prior defined time periods.

58. The system of claim 54, wherein the predicting the outdoor air temperature is executed based upon one of: (1) received weather forecasting information or (2) determined based upon a rolling average of the monitored outdoor air temperature.

59. The method of claim 11, wherein at least one monitored value is received via a communication network.

60. The method of claim 11, wherein at least two devices, collectively, estimate at least one operating metric and are in communication via a communication network.

61. A method for operating a system having a cooling system and ventilation system to vent outside air within a structure, the method comprising:

monitoring an interior temperature of the structure, monitoring an exterior temperature of ambient air outside of the structure;

defining a first time range and a second time range;

associating one or more operating parameters of the system with the first time range;

associating one or more operating parameters of the system with the second time range;

monitoring operational time and operational load of the cooling system for the first time range; and controlling the ventilation system during the second time range based upon the monitored operational time and operational load of the cooling system in the first time range, and the monitored interior and exterior temperatures.

* * * * *